US012579647B2

(12) United States Patent
Okano et al.

(10) Patent No.: US 12,579,647 B2
(45) Date of Patent: Mar. 17, 2026

(54) EVALUATION APPARATUS, EVALUATION METHOD, AND EVALUATION PROGRAM

(71) Applicant: Resonac Corporation, Tokyo (JP)

(72) Inventors: Yu Okano, Tokyo (JP); Junya Sakaguchi, Tokyo (JP); Takumi Nakajima, Tokyo (JP); Shinya Hirasawa, Tokyo (JP); Shimpei Takemoto, Tokyo (JP); Yoshishige Okuno, Tokyo (JP)

(73) Assignee: Resonac Corporation, Tokyo (JP)

( * ) Notice: Subject to any disclaimer, the term of this patent is extended or adjusted under 35 U.S.C. 154(b) by 344 days.

(21) Appl. No.: 18/574,187

(22) PCT Filed: Jun. 24, 2022

(86) PCT No.: PCT/JP2022/025255
§ 371 (c)(1),
(2) Date: Dec. 26, 2023

(87) PCT Pub. No.: WO2023/282087
PCT Pub. Date: Jan. 12, 2023

(65) Prior Publication Data
US 2024/0320824 A1     Sep. 26, 2024

(30) Foreign Application Priority Data
Jul. 8, 2021     (JP) ................................. 2021-113592

(51) Int. Cl.
*G06T 7/00*          (2017.01)
*G06T 7/194*         (2017.01)
(Continued)

(52) U.S. Cl.
CPC ............ *G06T 7/0012* (2013.01); *G06T 7/194* (2017.01); *G06T 15/00* (2013.01); *G06V 10/56* (2022.01);
(Continued)

(58) Field of Classification Search
CPC ....... G06T 7/0012; G06T 7/194; G06T 10/56; G06T 15/00; H04N 1/6008
(Continued)

(56) References Cited

U.S. PATENT DOCUMENTS 10,082,387 B2 *    9/2018    Bergren ................ G01N 21/91
2002/0195560 A1 *  12/2002   Yonushonis ........... G01N 21/91
                                                       250/302
(Continued)

FOREIGN PATENT DOCUMENTS

JP          S59-015842         1/1984
JP          2001-349874        12/2001
(Continued)

OTHER PUBLICATIONS

Daneshvar K et al: "Application of quantum dots as a fluorescent-penetrant for weld crack detection", Materials at High Temperatures, Butterworth Heinemann, Guildford, GB, vol. 27, No. 3, Sep. 1, 2010 (Sep. 1, 2010), pp. 179-182, XP009184120, ISSN: 0960-3409, DOI: 10.3184/096034010X12813744660988.

*Primary Examiner* — William D Titcomb
(74) *Attorney, Agent, or Firm* — IPUSA, PLLC

(57) ABSTRACT

An evaluation apparatus, an evaluation method, and an evaluation program applicable to a quality evaluation of sintered bodies are provided. The evaluation apparatus includes: an acquisition unit configured to acquire a cross-sectional image obtained by photographing a cross-section of a sintered body group stained with a staining solution; a generation unit configured to extract a saturation component for each of sintered bodies from the cross-sectional image, thereby to generate a saturation component image; and a visualization unit configured to visualize the saturation component image.

14 Claims, 14 Drawing Sheets

(51) Int. Cl.
    *G06T 15/00*       (2011.01)
    *G06V 10/56*       (2022.01)
    *H04N 1/60*       (2006.01)

(52) U.S. Cl.
    CPC . *H04N 1/6008* (2013.01); *G06T 2207/30096*
                                           (2013.01)

(58) Field of Classification Search
    USPC .......................................................... 382/128
    See application file for complete search history.

(56)                  References Cited

U.S. PATENT DOCUMENTS

| | | | |
|---|---|---|---|
| 2011/0267454 A1 | 11/2011 | Henrikson | |
| 2014/0037176 A1* | 2/2014 | Endo | G06T 7/32 |
| | | | 382/131 |
| 2017/0261313 A1* | 9/2017 | Bergren | G01B 11/22 |
| 2018/0016193 A1 | 1/2018 | Fukagawa et al. | |

FOREIGN PATENT DOCUMENTS

| | | |
|---|---|---|
| JP | 2005-035875 | 2/2005 |
| JP | 2008-524579 | 7/2008 |
| JP | 2010-185734 | 8/2010 |
| JP | 2013-117409 | 6/2013 |
| JP | 2013-195074 | 9/2013 |
| WO | 2016/140159 | 9/2016 |

* cited by examiner 5a
511    513    512    514      510
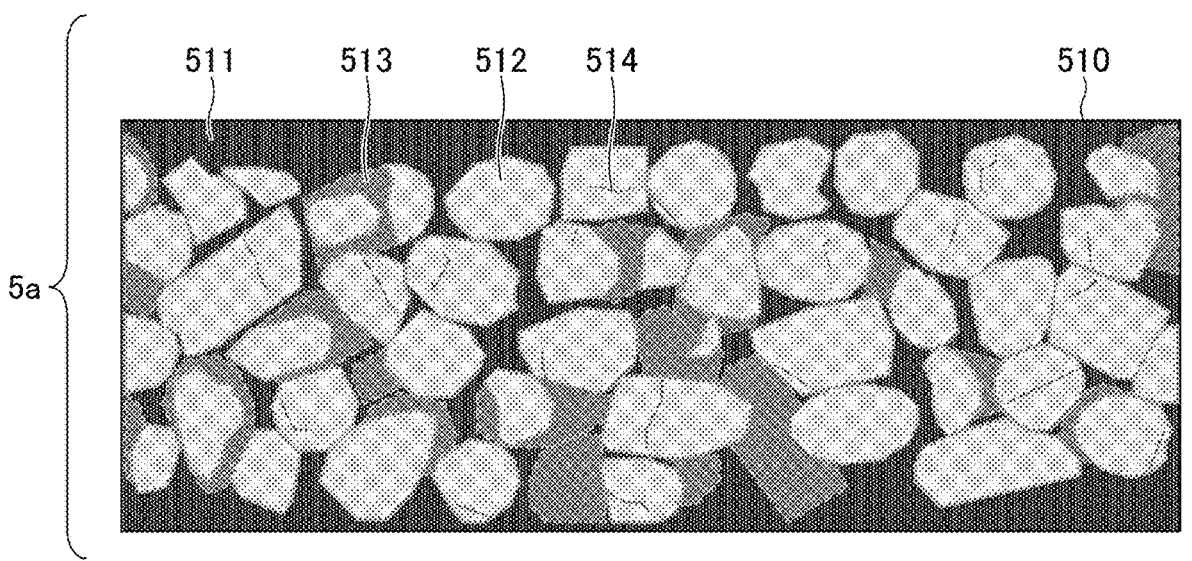
5b
520
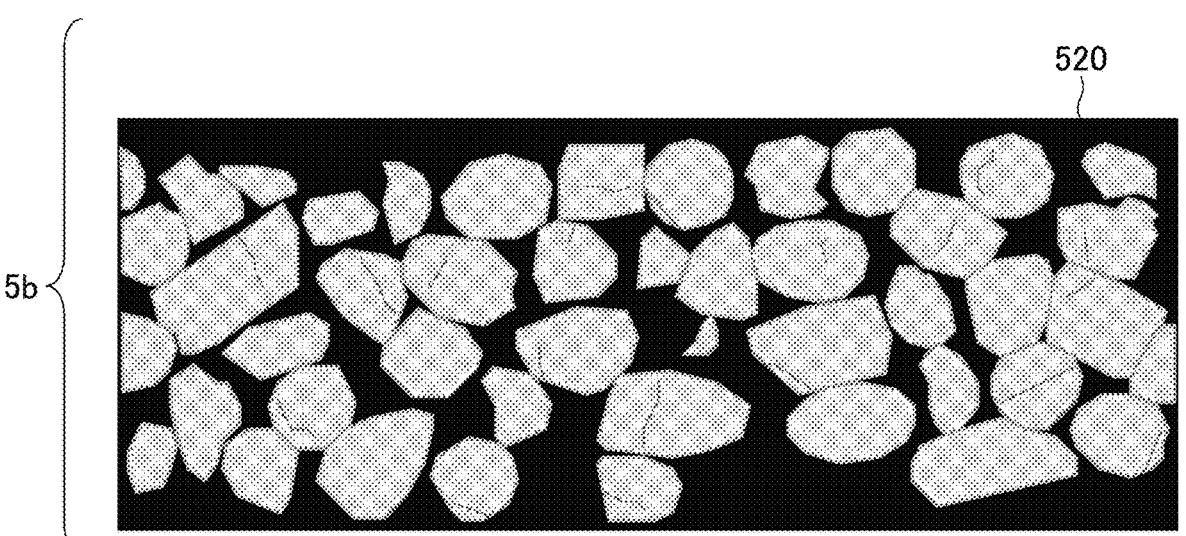
5c
533 534
532
531
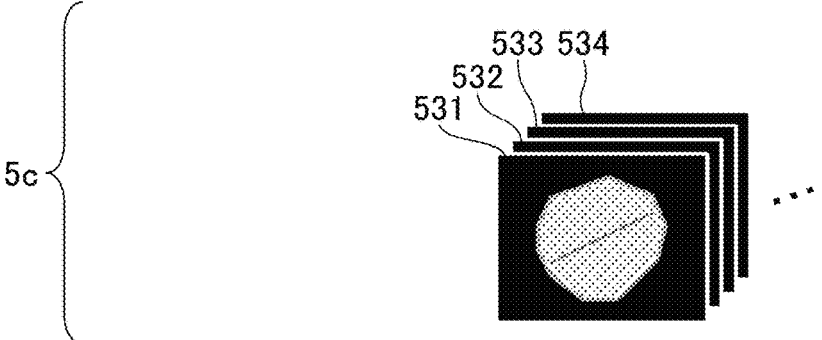
FIG.5

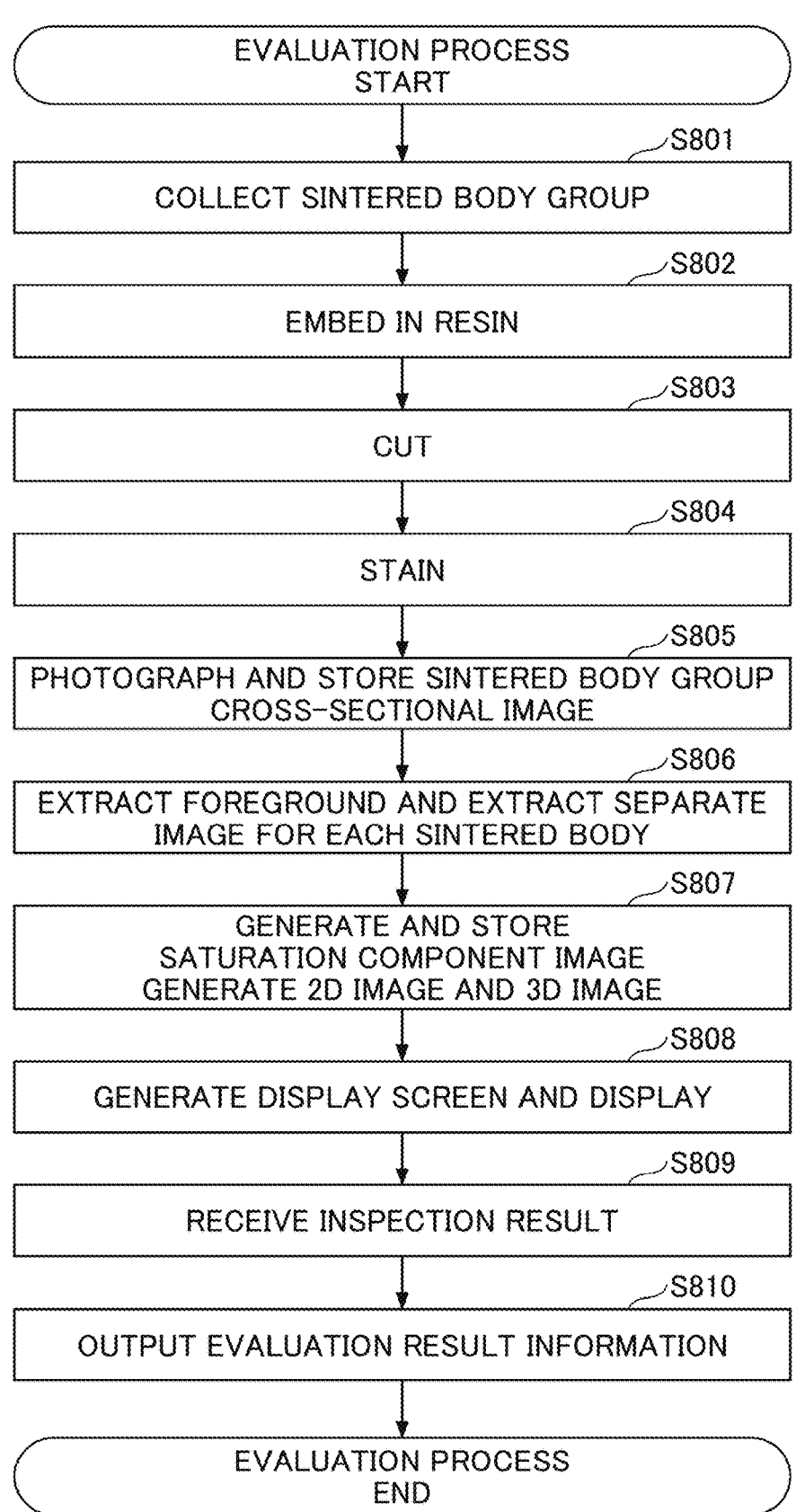

EVALUATION PROCESS
START

S801

COLLECT SINTERED BODY GROUP

S802

EMBED IN RESIN

S803

CUT

S804

STAIN

S805

PHOTOGRAPH AND STORE SINTERED BODY GROUP
CROSS-SECTIONAL IMAGE

S806

EXTRACT FOREGROUND AND EXTRACT SEPARATE
IMAGE FOR EACH SINTERED BODY

S807

GENERATE AND STORE
SATURATION COMPONENT IMAGE
GENERATE 2D IMAGE AND 3D IMAGE

S808

GENERATE DISPLAY SCREEN AND DISPLAY

S809

RECEIVE INSPECTION RESULT

S810

OUTPUT EVALUATION RESULT INFORMATION

EVALUATION PROCESS
END

FIG.8

EVALUATION APPARATUS, EVALUATION METHOD, AND EVALUATION PROGRAM

TECHNICAL FIELD

The present disclosure relates to an evaluation apparatus, an evaluation method, and an evaluation program.

BACKGROUND ART

Quality evaluation of sintered bodies is performed by, for example, by calculating the percentage of sintered bodies in which deep cracks have occurred, among a plurality of sintered bodies (hereinafter referred to as a sintered body group). Specifically, the quality evaluation is performed by an inspector or the like observing the cross section of each of sintered bodies using an optical microscope to determine the presence or absence of deep cracks. Therefore, the quality evaluation of the sintered body has a problem of a high workload for the inspector or the like.

Meanwhile, a determination method has been proposed in which the object to be inspected is photographed and the presence or absence of cracks is determined from the photographed image.

PRIOR ART DOCUMENT

Patent Document

Patent Document 1: Japanese Laid-Open Patent Publication No. 2013-117409
Patent Document 2: Japanese Laid-Open Patent Publication No. 2001-349874
Patent Document 3: Japanese Laid-Open Patent Publication No. 2013-195074

DISCLOSURE OF THE INVENTION

Problem to be Solved by the Invention

However, in the case of the photographed image, because there is no information in the depth direction, the presence or absence of deep cracks cannot be determined with high accuracy. Therefore, the above determination method cannot be applied to the quality evaluation of the sintered bodies.

One object of the present disclosure is to provide an evaluation apparatus, an evaluation method, and an evaluation program applicable to the quality evaluation of the sintered bodies.

Means of Solving the Problem

The first aspect of the present disclosure is an evaluation apparatus including:

an acquisition unit configured to acquire a cross-sectional image obtained by photographing a cross-section of a sintered body group stained with a staining solution;

a generation unit configured to extract a saturation component for each of sintered bodies from the cross-sectional image, thereby to generate a saturation component image; and a visualization unit configured to visualize the saturation component image.

The second aspect of the present disclosure is the evaluation apparatus of the first aspect, wherein the generation unit is configured to convert each pixel value of a separate image that is extracted for each of the sintered bodies from the cross-sectional image, from an RGB color space to an HSV color space, and to extract a saturation component from the converted each pixel value, thereby to generate the saturation component image.

The third aspect of the present disclosure is the evaluation apparatus of the second aspect, wherein the cross-sectional image is obtained by cutting a resin in which the sintered body group is embedded, staining the cross-section obtained by the cutting with the staining solution, and photographing the cross-section, and the generation unit is configured to extract a region of the sintered body exposed in the cross-section as a foreground region from the cross-sectional image, thereby to extract the separate image for each of the sintered bodies from the cross-sectional image.

The fourth aspect of the present disclosure is the evaluation apparatus of the third aspect, wherein the generation unit is configured to process a background region other than the foreground region in the cross-sectional image, and to extract the foreground region from the processed cross-sectional image.

The fifth aspect of the present disclosure is the evaluation apparatus of the first aspect, wherein the visualization unit is configured to generate a two-dimensional image in which a value of a saturation component of each of pixels of the saturation component image is assigned to a specific color, thereby to visualize the saturation component image.

The sixth aspect of the present disclosure is the evaluation apparatus of the fifth aspect, wherein the visualization unit is configured to generate a three-dimensional image in which the value of the saturation component of each of the pixels of the saturation component image is assigned to the specific color and also assigned to a coordinate in a height direction in a three-dimensional space, thereby to visualize the saturation component image.

The seventh aspect of the present disclosure is the evaluation apparatus of the sixth aspect, further comprising a storage unit in which an inspection result for each of the sintered bodies, which is input in response to displaying a display screen including one or both of the two-dimensional image and the three-dimensional image, is stored in association with the saturation component image.

The eighth aspect of the present disclosure is the evaluation apparatus of the seventh aspect, wherein the inspection result is any one of: a crack of a first depth level is included in the sintered body; a crack of a second depth level shallower than the first depth level is included in the sintered body; or no cracks are included in the sintered body.

The ninth aspect of the present disclosure is the evaluation apparatus of the eighth aspect, wherein evaluation result information including an aggregate result and a calculation result is output, in which the aggregate result is obtained by aggregating, for the sintered body group, the inspection result for each of the sintered bodies, and in which the calculation result is obtained by calculating a percentage of sintered bodies that include the crack of the first depth level.

The tenth aspect of the present disclosure is the evaluation apparatus of the eighth aspect, wherein a training process is performed on a training model using training data read from the storage unit with the saturation component image as input data and the inspection result in association with the saturation component image as ground-truth data.

The eleventh aspect of the present disclosure is the evaluation apparatus of the eighth aspect, wherein a trained model, which has been performed a training process using training data read from the storage unit with the saturation component image as the input data and the inspection result in association with the saturation component image as the ground-truth data, is input with a saturation component image generated from a newly photographed cross-sectional image, to predict an inspection result.

The twelfth aspect of the present disclosure is the evaluation apparatus of the eleventh aspect, wherein evaluation result information including an aggregate result and a calculation result is output, in which the aggregate result is obtained by aggregating, for the sintered body group, the inspection result predicted for each of the sintered bodies, and in which the calculation result is obtained by calculating a percentage of sintered bodies that include the crack of the first depth level.

The thirteenth aspect of the present disclosure is an evaluation method including:

an acquisition step of acquiring a cross-sectional image obtained by photographing a cross-section of a sintered body group stained with a staining solution;

a generation step of extracting a saturation component for each of sintered bodies from the cross-sectional image, thereby generating a saturation component image; and a visualization step of visualizing the saturation component image.

The fourteenth aspect of the present disclosure is an evaluation program for causing a computer to execute:

an acquisition step of acquiring a cross-sectional image obtained by photographing a cross-section of a sintered body group stained with a staining solution;

a generation step of extracting a saturation component for each of sintered bodies from the cross-sectional image, thereby generating a saturation component image; and a visualization step of visualizing the saturation component image.

Effects of the Invention

According to the present disclosure, it is possible to provide an evaluation apparatus, an evaluation method, and an evaluation program applicable to the quality evaluation of the sintered bodies.

BRIEF DESCRIPTION OF DRAWINGS

FIG. 5 is a diagram illustrating a specific example of processing performed by each of an image acquisition unit, a foreground extraction unit, and a separate image generation unit.

FIG. 8 is a first flowchart illustrating a flow of an evaluation process.

MODE OF CARRYING OUT THE INVENTION

Figure 1:
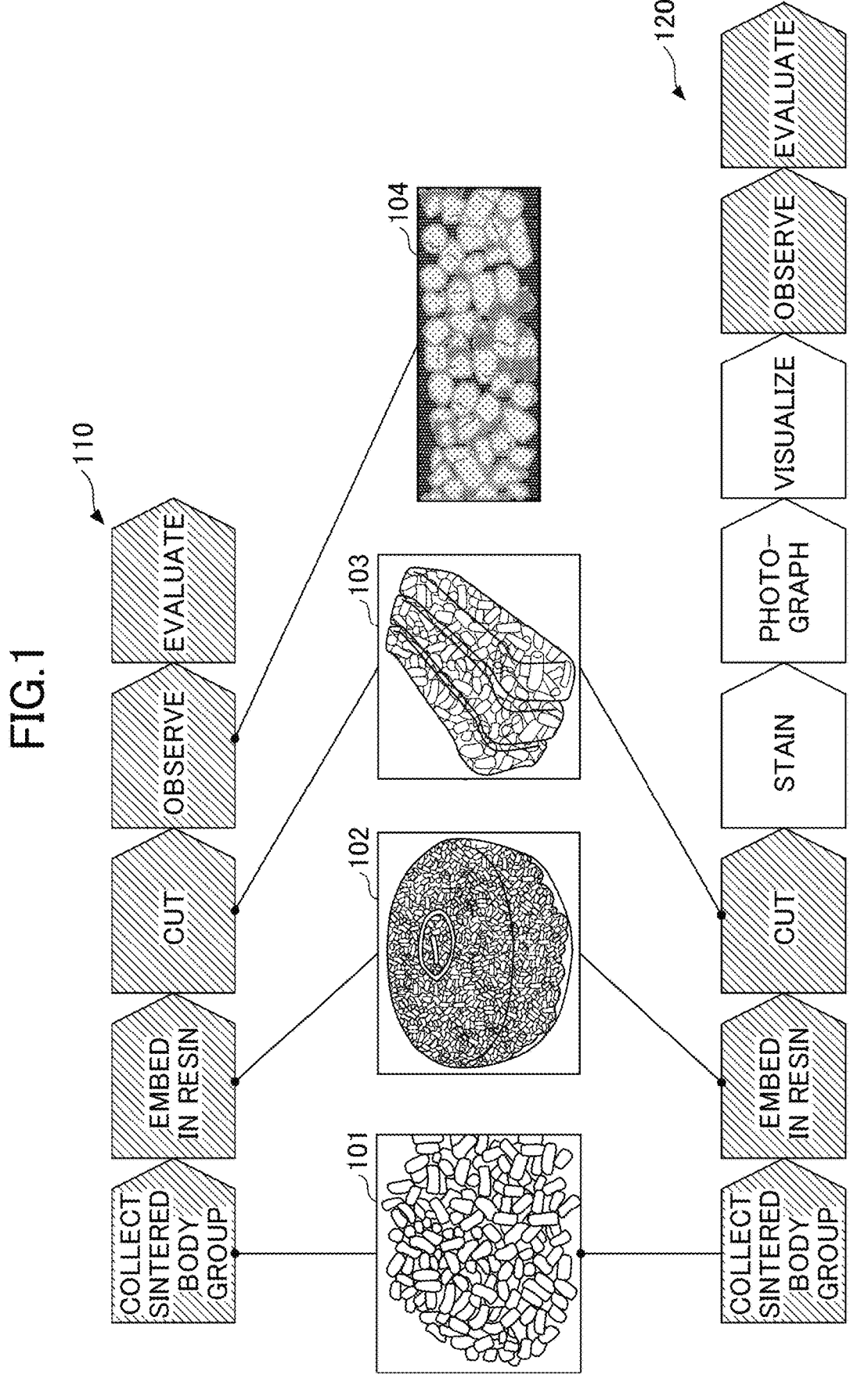
FIG. 1 is a diagram for explaining a quality evaluation procedure of a sintered body.

Hereinafter, each embodiment will be described with reference to the accompanying drawings. In the present specification and the drawings, components having substantially the same functional configuration are designated by the same reference numerals and redundant explanation will be omitted.

First Embodiment

<Quality Evaluation Procedure of Sintered Body>

First, a quality evaluation procedure of a sintered body using an evaluation apparatus according to the present embodiment will be described. The description will be provided in comparison with a typical quality evaluation procedure of the sintered body.

FIG. 1 is a diagram for explaining the quality evaluation procedure of the sintered body. In FIG. 1, the reference numeral 110 indicates a typical quality evaluation procedure of the sintered body. As illustrated in the reference numeral 110, in evaluating the quality of the sintered body, first, a sintered body group to be evaluated is collected (see the reference numeral 101). Subsequently, the collected sintered body group is embedded in resin (see the reference numeral 102). Subsequently, the sintered body group embedded in the resin is cut (see the reference numeral 103). Subsequently, using an optical microscope, the presence or absence of a deep crack is determined by observing cracks in each of sintered bodies on the cross section of the cut sintered body group (see the reference numeral 104). Subsequently, the quality of the sintered body is evaluated by calculating the percentage of the sintered bodies in which a deep crack has occurred.

Additionally, in FIG. 1, the reference numeral 120 indicates the quality evaluation procedure of the sintered body when the evaluation apparatus according to the present embodiment is used. In the quality evaluation procedure indicated by the reference numeral 120, the procedures presented with a diagonal line background are the same as those in the procedure indicated by the reference numeral 110. Therefore, the procedures presented with a white background will be mainly described herein.

In the case of the procedure indicated by the reference numeral 120, the sintered body group embedded in the resin is cut and then stained with a staining solution. Accordingly, in the sintered body group embedded in the resin and cut, cracks in the cross section have a saturation corresponding to the depth.

In the case of the procedure indicated by the reference numeral 120, the sintered body group is cut and the cross section thereof is photographed using an RGB camera. In the case of the procedure indicated by the reference numeral 120, an RGB cross-sectional image (hereinafter referred to as a sintered body group cross-sectional image) is obtained by photographing, the saturation component is extracted from the RGB cross-sectional image, and a saturation component image of each of sintered bodies is generated. As described above, because the crack in the cross section has a saturation corresponding to the depth, the saturation component image can be an image representing the crack depth of the cross section of each of sintered bodies.

Further, in the case of the procedure indicated by the reference numeral 120, by generating a display screen including a two-dimensional image or a three-dimensional image emphasizing the crack depth in the saturation component image, the crack in the cross section of each of sintered bodies is visualized.

Thus, by observing the two-dimensional image or the three-dimensional image in which the crack in the cross section of each of sintered bodies is visualized, the inspector can determine the presence or absence of a deep crack with high accuracy. As a result, according to the evaluation apparatus according to the present embodiment, it is possible to appropriately evaluate the quality of the sintered body even when the determination based on the photographed image is performed.

<Relationship between Crack Depth and Staining Solution>

Figure 2:
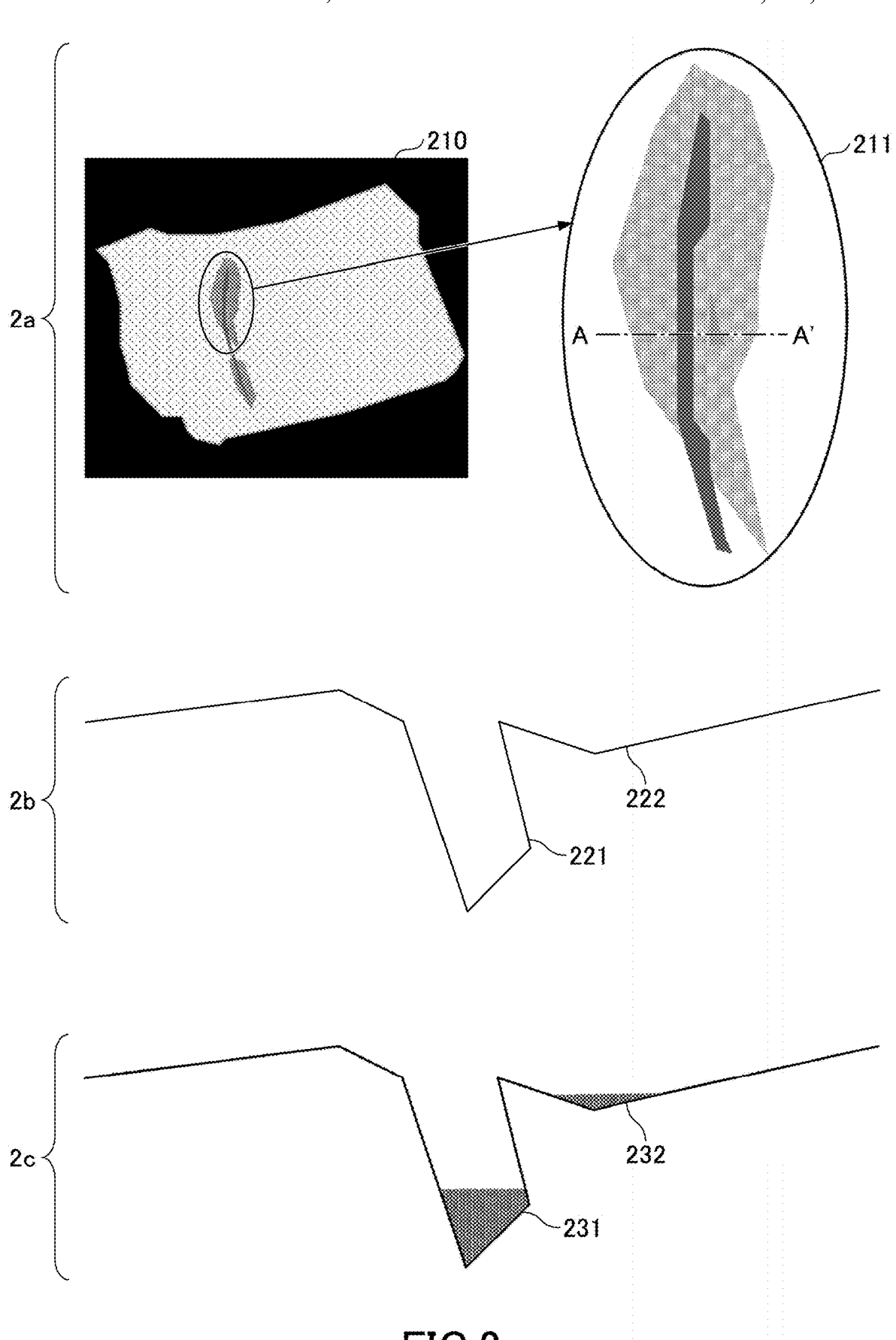
FIG. 2 is a diagram illustrating a relationship between crack depth and staining solution.

Next, the relationship between the crack depth of the cross section and the staining solution will be explained. FIG. 2 is a diagram illustrating the relationship between the crack depth and the staining solution. The image 210 illustrated in 2*a* of FIG. 2 is a separate image (RGB image) for each of sintered bodies. The separate image is obtained by cutting the sintered body group embedded in the resin, staining the cross section obtained by the cutting with the staining solution, and extracting the separate image from the photographed sintered body group cross-sectional image for each of sintered bodies. The enlarged image 211 illustrated in 2*a* of FIG. 2 is an enlarged image of a part of the image 210.

In contrast, 2*b* of FIG. 2 illustrates a shape of the A-A' cross section of the enlarged image 211, wherein the reference numeral 221 indicates a deep crack (a crack of a first depth level) and the reference numeral 222 indicates a shallow crack (a crack of a second depth level). Note that, 2*b* of FIG. 2 illustrates the cross section of the sintered body that has not been stained by the staining solution.

In contrast, 2*c* of FIG. 2 illustrates the shape of the A-A' cross section of the enlarged image 211, wherein the reference numeral 231 indicates the deep crack into which the staining solution is penetrated, and the reference numeral 232 indicates the shallow crack into which the staining solution is penetrated.

As is clear from the comparison between the enlarged image 211 of 2*a* of FIG. 2 and the reference numerals 231 and 232 of 2*c* of FIG. 2, in the case of the deep crack, the staining solution penetrates deeply, so the color intensity increases (that is, the saturation increases) depending on the crack depth. In contrast, in the case of the shallow crack, the staining solution only penetrates shallowly, so the color intensity remains the same (that is, the saturation remains low).

Therefore, in the sintered body group cross-sectional image, the cracks in the cross section have saturation corresponding to their respective depths. As a result, by extracting the saturation component from the sintered body group cross-sectional image, an image representing the crack depth in the cross section of each of sintered bodies is generated.

Thus, in the quality evaluation procedure of the present embodiment, information in the depth direction is substituted in the photographed image by staining with the staining solution and extracting the saturation component.

<Hardware Configuration of Evaluation Apparatus>

Figure 3:
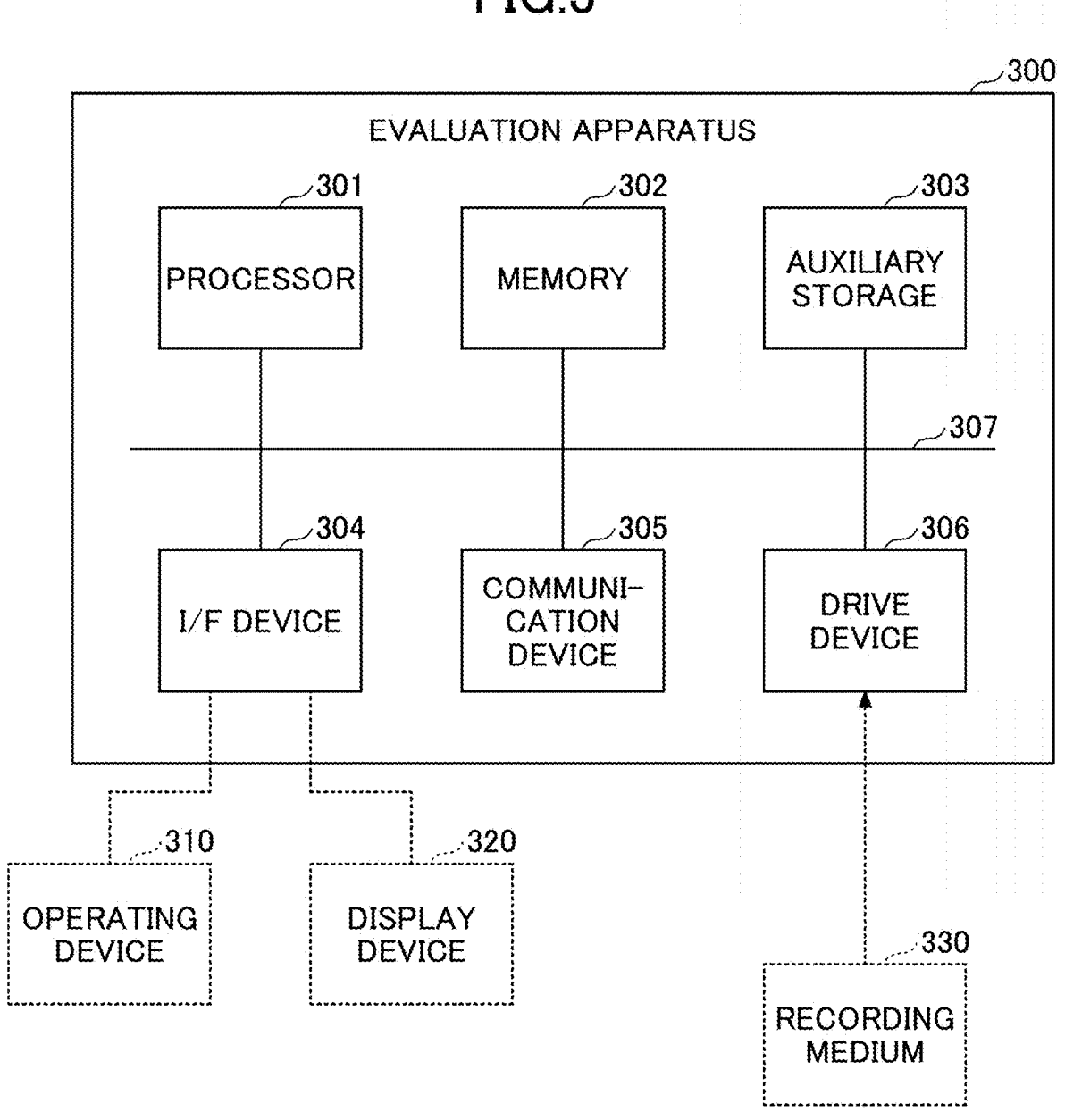
FIG. 3 is a diagram illustrating an example of a hardware configuration of an evaluation apparatus.

Next, a hardware configuration of the evaluation apparatus will be described. FIG. 3 is a diagram illustrating an example of the hardware configuration of the evaluation apparatus.

As illustrated in FIG. 3, the evaluation apparatus 300 includes a processor 301, a memory 302, an auxiliary storage 303, an interface (I/F) device 304, a communication device 305, and a drive device 306. The hardware of the evaluation apparatus 300 is connected to each other via a bus 307.

The processor 301 includes various computing devices such as a central processing unit (CPU) and a graphics processing unit (GPU). The processor 301 reads and executes various programs (for example, an evaluation program described later, and the like) on the memory 302.

The memory 302 includes a main storage device such as a read only memory (ROM) and a random access memory (RAM). The processor 301 and the memory 302 form what is known as a computer, and the processor 301 executes various programs read on the memory 302, and the computer performs various functions.

The auxiliary storage 303 stores various programs and various data used when various programs are executed by the processor 301.

The I/F device 304 is a connection device connecting an operation device 310, a display device 320, and the evaluation apparatus 300. The operation device 310 is an operation device for the inspector to input various instructions to the evaluation apparatus 300. The display device 320 is a display device for providing a display screen to the inspector. The communication device 305 is a communication device for communicating with an external device (not illustrated) via a network.

The drive device 306 is a device for setting a recording medium 330. The recording medium 330 herein includes a medium for recording information optically, electrically, or magnetically, such as a CD-ROM, a flexible disk, a magneto-optical disk, or the like. The recording medium 330 may also include a semiconductor memory or the like for recording information electrically, such as a ROM, a flash memory, or the like.

The various programs installed in the auxiliary storage 303 are installed, for example, when the recording medium 330 distributed is set in the drive device 306 and the various programs recorded in the recording medium 330 are read out by the drive device 306. Alternatively, the various programs installed in the auxiliary storage 303 may be installed by being downloaded from the network via the communication device 305.

<Functional Configuration of Evaluation Apparatus>

Figure 4:
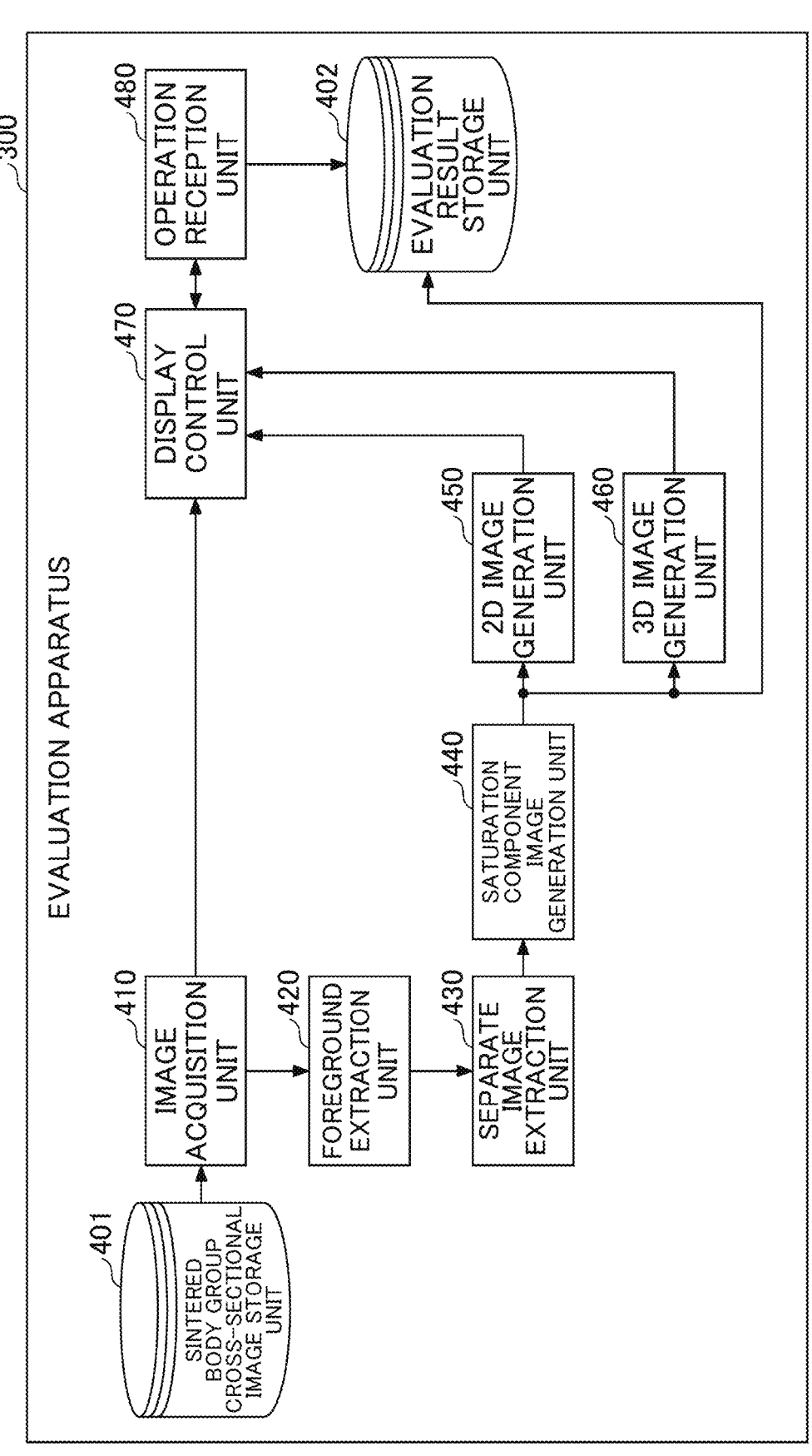
FIG. 4 is a diagram illustrating an example of a functional configuration of the evaluation apparatus.

Next, a functional configuration of the evaluation apparatus 300 will be described. FIG. 4 is a diagram illustrating an example of the functional configuration of the evaluation apparatus. As described above, an evaluation program is installed in the evaluation apparatus 300. When the program is executed, the evaluation apparatus 300 functions as an image acquisition unit 410, a foreground extraction unit 420, a separate image extraction unit 430, a saturation component image generation unit 440, a two-dimensional image generation unit 450, a three-dimensional image generation unit 460, a display control unit 470, and an operation reception unit 480 (see FIG. 4).

The image acquisition unit 410 is an example of an acquisition unit, and acquires the sintered body group cross-sectional image from a sintered body group cross-sectional image storage unit 401, and notifies a foreground extraction unit 420 and a display control unit 470. It is assumed that the sintered body group cross-sectional image is stored in advance in the sintered body group cross-sectional image storage unit 401, and attribute information of the sintered body group is added to each of the sintered body group cross-sectional images.

The foreground extraction unit 420, the separate image extraction unit 430, and the saturation component image generation unit 440 are examples of a generation unit.

Among them, the foreground extraction unit 420 extracts a foreground region from the sintered body group cross-sectional image notified from the image acquisition unit 410, and processes the region other than the foreground region (a background region) to black (R value=0, G value=0, and B value=0). The foreground region refers to the region where the sintered body is exposed on the cut surface when the sintered body group embedded in the resin is cut.

The separate image extraction unit 430 extracts the separate image for each of sintered bodies from the sintered body group cross-sectional image in which the background region is processed by the foreground extraction unit 420, and notifies the saturation component image generation unit 440 of each extracted separate image.

The saturation component image generation unit 440 converts each pixel value of the foreground region of each separate image notified from the separate image extraction unit 430 from the RGB color space to the HSV color space. The conversion from the RGB color space to the HSV color space is performed based on the following formula.

$$H = \begin{cases} \text{undefined,} & \text{if } MIN = MAX \qquad \text{[Math 1]} \\ 60 \times \dfrac{G-R}{MAX-MIN} + 60, & \text{if } MIN = B \\ 60 \times \dfrac{B-G}{MAX-MIN} \times 180, & \text{if } MIN = R \\ 60 \times \dfrac{R-B}{MAX-MIN} + 300, & \textit{if } MIN = G \end{cases}$$

$$V = MAX$$

$$\text{CONE MODEL } S = MAX - MIN$$

In the above formula, MAX refers to the largest value among the R, G, and B values constituting each pixel value of the foreground region. In the above formula, MIN refers to the smallest value among the R, G, and B values constituting each pixel value of the foreground region. Note that, in the present embodiment, it is assumed that the R, G, and B values are any of the values from 0 to 255.

The saturation component image generation unit 440 generates a saturation component image by extracting the saturation component (S value) in the foreground region of each separate image obtained by converting each pixel value from the RGB color space to the HSV color space. Further, the saturation component image generation unit 440 notifies the two-dimensional image generation unit 450, the three-dimensional image generation unit 460, and an evaluation result storage unit 402 of the generated saturation component image. Each pixel value of the foreground region in the saturation component image is any value of 0 to 255.

The two-dimensional image generation unit 450 and the three-dimensional image generation unit 460 are examples of a visualization unit.

Among them, the two-dimensional image generation unit 450 generates a two-dimensional image by assigning each pixel value (any value of 0 to 255) of the foreground region in the saturation component image notified by the saturation component image generation unit 440, to a specific color. For example, the two-dimensional image generation unit 450 generates a two-dimensional image by assigning each pixel value (any value of 0 to 255) of the foreground region in the saturation component image to any color in the range of blue, green, yellow, orange, and red.

The two-dimensional image generation unit 450 notifies the display control unit 470 of the generated two-dimensional image.

The three-dimensional image generation unit 460 generates a three-dimensional image by assigning each pixel value (any value of 0 to 255) of the saturation component image notified by the saturation component image generation unit 440, to a specific color and also to a z value (coordinate in the height direction) of the three-dimensional space.

For example, the three-dimensional image generation unit 460 generates a three-dimensional image by assigning each pixel value (any value of 0 to 255) of the saturation component image to any color in the range of blue, green, yellow, orange, and red and also to a z value (any value of 0 to 255) of the three-dimensional space.

The three-dimensional image generation unit 460 notifies the display control unit 470 of the generated three-dimensional image.

The display control unit 470 generates a display screen and displays it to the inspector by the display device 320. The display control unit 470 generates the display screen using the sintered body group cross-sectional image and the attribute information acquired from the image acquisition unit 410, the two-dimensional image notified by the two-dimensional image generation unit 450, and the three-dimensional image notified by the three-dimensional image generation unit 460.

The display control unit 470 switches, when various instructions are notified from the operation reception unit 480, the display screen in response to the various instructions notified. For example, when a display instruction of the two-dimensional image and a display instruction of the three-dimensional image of the sintered body designated by the inspector among the sintered body group cross-sectional image displayed on the display screen are notified, the display control unit 470 switches the display screen so as to display the two-dimensional image and the three-dimensional image of the sintered body. For example, when the input instruction of the inspection result for the sintered body designated by the inspector is notified, the display control unit 470 switches the display screen so as to display the display contents corresponding to the input instruction.

The operation reception unit 480 accepts the operation of the inspector while the display screen generated by the display control unit 470 is displayed. For example, when the operation reception unit 480 receives a designation of the sintered body from the inspector, it notifies the display control unit 470 of the display instruction of the two-dimensional image and the display instruction of the three-dimensional image of the sintered body. For example, when the inspection result is input for each of sintered bodies included in the sintered body group cross-sectional image, the operation reception unit 480 notifies the display control unit 470 of the input instruction of the inspection result.

The operation reception unit 480 associates the inspection result of each of sintered bodies with the saturation component image and stores it in the evaluation result storage unit 402. The operation reception unit 480 aggregates the inspection result of each of sintered bodies and stores the aggregate result for the entire sintered body group in the evaluation result storage unit 402. Further, the operation reception unit 480 calculates the percentage of sintered bodies in which a deep crack has occurred and stores the calculation result in the evaluation result storage unit 402.

<Specific Examples of Processing by Each Unit of Evaluation Apparatus>

Next, specific examples of processing of each unit of the evaluation apparatus 300 (the image acquisition unit 410 to the operation reception unit 480) will be described.

(1) Specific Example of Processing by Image Acquisition Unit 410, Foreground Extraction Unit 420, and Separate Image Extraction Unit 430

First, specific examples of processing performed by the image acquisition unit 410, the foreground extraction unit 420, and the separate image extraction unit 430 of the evaluation apparatus 300 will be described. FIG. 5 is a diagram illustrating a specific example of processing performed by each unit of the image acquisition unit, the foreground extraction unit, and the separate image generation unit.

The sintered body group cross-sectional image 510 illustrated in 5*a* of FIG. 5 is an example of the sintered body group cross-sectional image acquired by the image acquisition unit 410 from the sintered body group cross-sectional image storage unit 401. In the sintered body group cross-sectional image 510, the hatched region indicated by the reference numeral 511 represents a resin in which the sintered body group is embedded. The hatched region indicated by the reference numeral 512 represents a sintered body group embedded in the resin and exposed on the cut surface. The hatched region indicated by the reference numeral 513 represents a sintered body group embedded in the resin and not exposed on the cut surface. Further, the reference numeral 514 represents a crack candidate in a sintered body group embedded in the resin that is exposed on the cut surface.

The crack candidate includes a crack (a deep crack and a shallow crack) that occurs in a sintered body group exposed on the cut surface and one that appears to be a crack but is not a crack.

The sintered body group cross-sectional image 520 illustrated in 5*b* of FIG. 5 is an example of a sintered body group cross-sectional image after processing in which the foreground extraction unit 420 extracts the foreground region from the sintered body group cross-sectional image 510 and processes the region other than the foreground region to black. As illustrated in 5*b* of FIG. 5, the sintered body group cross-sectional image 520 is obtained by extracting the hatched region indicated by the reference numeral 512 from the sintered body group cross-sectional image 510 and processing the hatched region indicated by the reference numeral 511 and the hatched region indicated by the reference numeral 513 to black.

The extraction method for extracting the hatched region indicated by the reference numeral 512 from the sintered body group cross-sectional image 510 can be freely determined. For example, a specific region may be designated in advance from the hatched region indicated by the reference numeral 512, and a region similar in luminance distribution to the designated region may be extracted.

Alternatively, a plurality of pairs of the sintered body group cross-sectional image after processing and the sintered body group cross-sectional image before processing, obtained by extracting a region having a similar luminance distribution, may be prepared in advance, and a training model may be learned to generate the sintered body group cross-sectional image after processing.

The separate images 531, 532, 533, 534, and . . . in 5*c* of FIG. 5 are examples of separate images for each of sintered bodies obtained by the separate image extraction unit 430 extracting a foreground region from the sintered body group cross-sectional image 520. Coordinates indicating the extraction position of the foreground region in the sintered body group cross-sectional image 520 are associated with the separate images 531, 532, 533, 534, and . . . .

The extraction method for extracting the foreground region from the sintered body group cross-sectional image 520 can be freely determined. For example, a Watershed algorithm, which performs region separation using brightness gradient, or the like may be used.

Figure 6A:
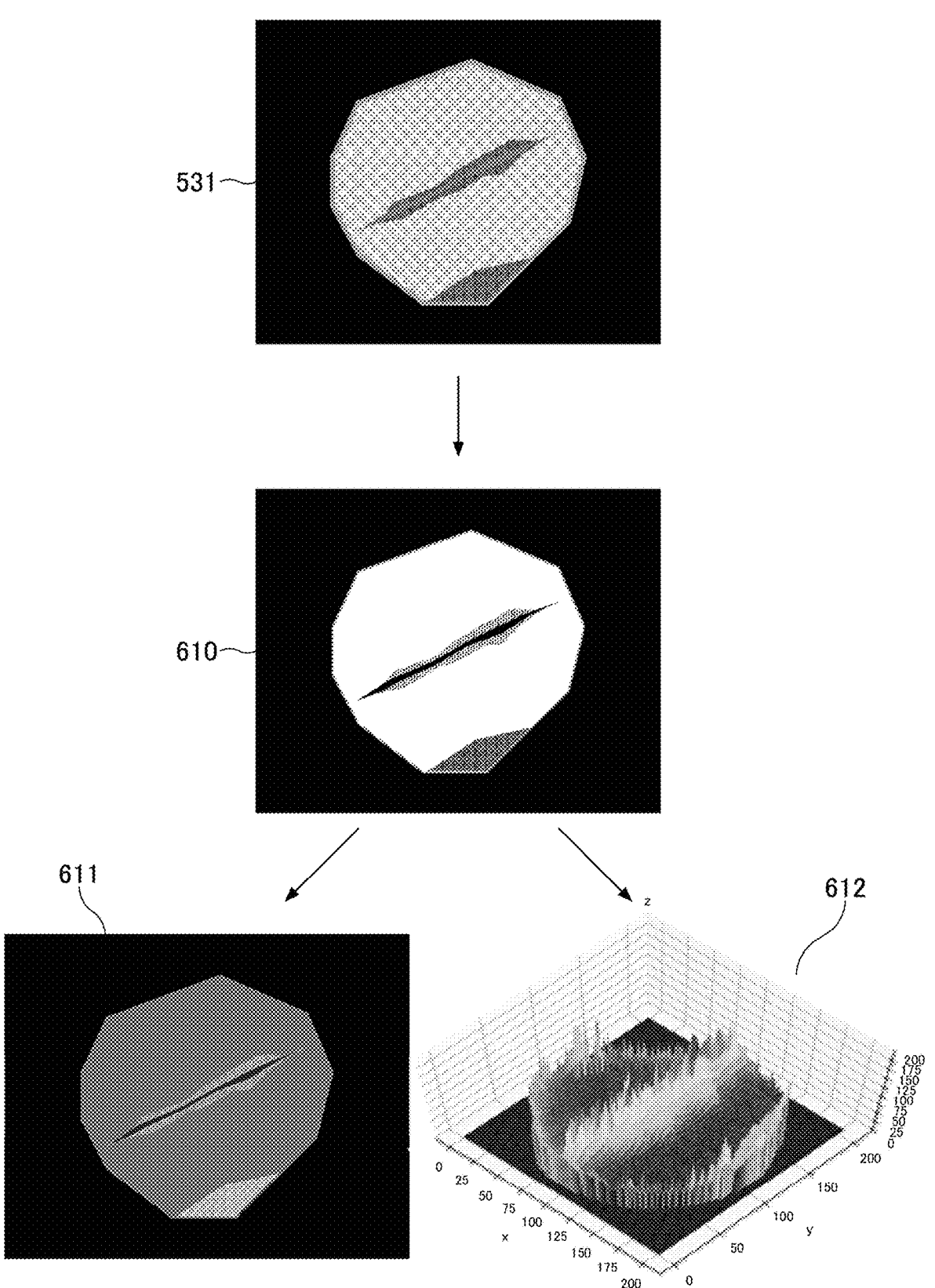
FIG. 6A is a first diagram illustrating a specific example of processing performed by each of a saturation component image generation unit, a two-dimensional image generation unit, and a three-dimensional image generation unit.
Figure 6B:
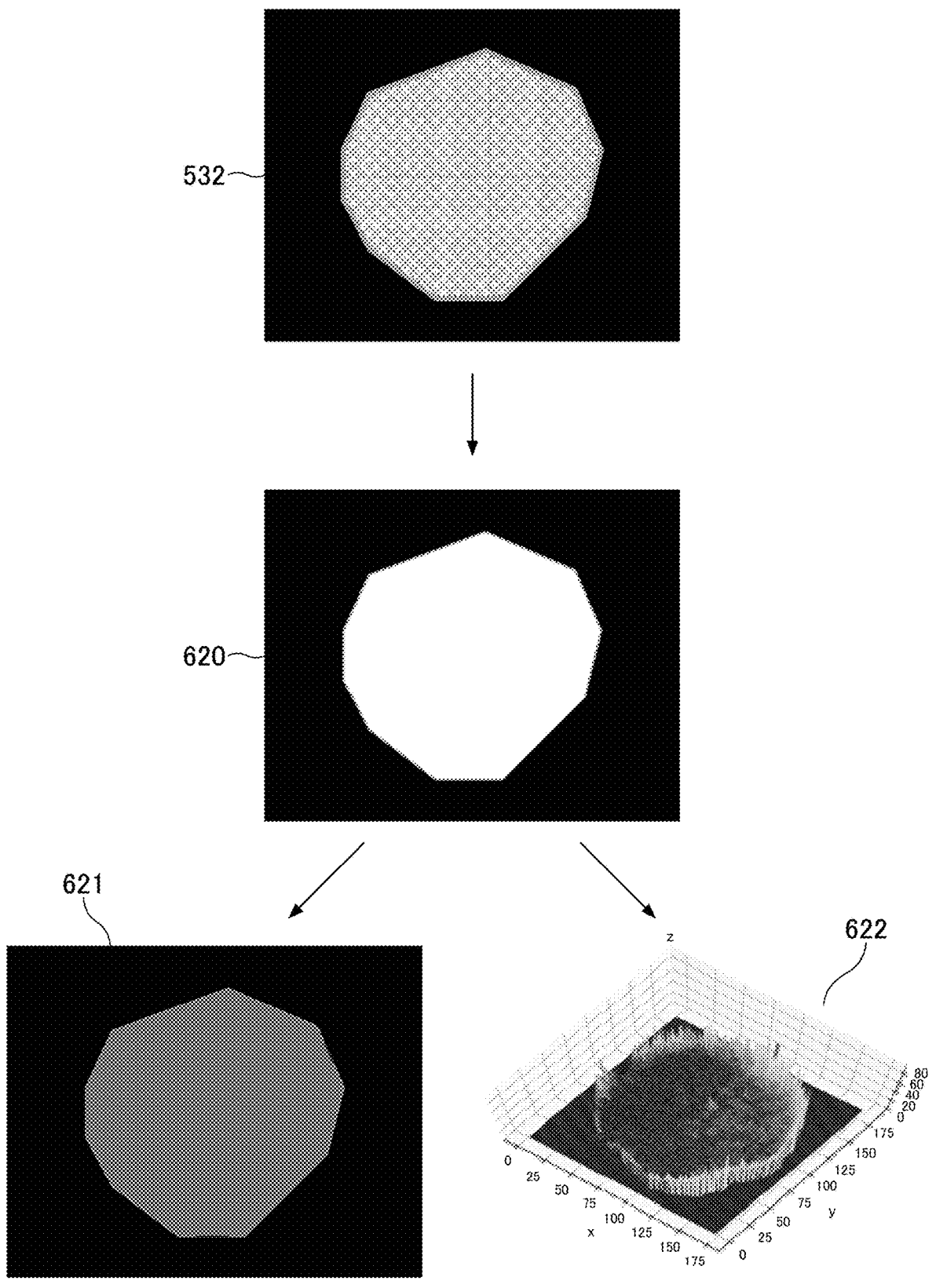
FIG. 6B is a second diagram illustrating a specific example of processing performed by each of the saturation component image generation unit, the two-dimensional image generation unit, and the three-dimensional image generation unit.

(2) Specific Examples of Processing by Saturation Component Image Generation Unit, Two-Dimensional Image Generation Unit, and Three-Dimensional Image Generation Unit Next, specific examples of processing performed by the saturation component image generation unit 440, the two-dimensional image generation unit 450, and the three-dimensional image generation unit 460 of the evaluation apparatus 300 will be described. FIGS. 6A and 6B are first and second views illustrating specific examples of processing performed by each unit of the saturation component image generation unit, the two-dimensional image generation unit, and the three-dimensional image generation unit.

In FIG. 6A, the separate image 531 is an enlarged view of the separate image obtained by extracting the foreground region from the sintered body group cross-sectional image 520 by the separate image extraction unit 430. As described above, each pixel value of the foreground region in the separate image 531 is composed of R, G, and B values.

The saturation component image generation unit 440 converts each pixel value of the foreground region in the separate image 531 from the RGB color space to the HSV color space, and extracts the saturation component (S value) to generate the saturation component image 610. For convenience of explanation, the saturation component image 610 of FIG. 6A illustrates each pixel value (any value of 0 to 255) of the converted foreground region assigned to any color of black and white.

As can be seen from the comparison between the saturation component image 610 and the separate image 531, the foreground region of the saturation component image 610 consisting of the saturation component (S value) has a higher contrast than the foreground region of the separate image 531 consisting of the RGB value. In other words, the saturation component image 610 can be said to be an image in which the difference in the color intensity of the part stained by the staining solution is emphasized (that is, the crack depth is emphasized).

The two-dimensional image generation unit 450 assigns each pixel value (any value of 0 to 255) of the foreground region in the generated saturation component image 610 to any color in the range of blue, green, yellow, orange, and red, thereby generating a two-dimensional image 611. The example of FIG. 6A illustrates that blue is assigned to the pixel having the smallest pixel value in the foreground region of the saturation component image 610, and red is assigned to the pixel having the largest pixel value in the foreground region of the saturation component image 610.

The three-dimensional image generation unit 460 assigns each pixel value (any value of 0 to 255) of the foreground region in the generated saturation component image 610 to any color in the range of blue, green, yellow, orange, and red. Further, the three-dimensional image generation unit 460 assigns each pixel value (any value of 0 to 255) of the foreground region in the generated saturation component image 610 to a z-value (any value of 0 to 255) in the three-dimensional space. Thus, the three-dimensional image generation unit 460 generates a three-dimensional image 612.

In the three-dimensional image 612, the x and y directions represent the position of each pixel of the saturation component image 610, and the z direction represents the pixel value (pixel value of the saturation component) of each pixel of the saturation component image 610.

By generating the two-dimensional image 611 and the three-dimensional image 612, the image (the saturation component image 610) corresponding to the crack depth can be visualized more clearly.

Similarly, in FIG. 6B, the separate image 532 is an enlarged view of the separate image obtained by extracting the foreground region from the sintered body group cross-sectional image 520 by the separate image extraction unit 430. As described above, each pixel value of the foreground region in the separate image 532 is composed of R, G, and B values.

The saturation component image generation unit 440 converts each pixel value of the foreground region in the separate image 532 from the RGB color space to the HSV color space, and extracts the saturation component (S value) to generate the saturation component image 620. For convenience of explanation, the saturation component image 620 of FIG. 6B illustrates each pixel value (any value of 0 to 255) of the converted foreground region assigned to any color of black and white.

As can be seen from the comparison between the saturation component image 620 and the separate image 532, the foreground region of the saturation component image 620 consisting of the saturation component (S value) has a higher contrast than the foreground region of the separate image 532 consisting of the RGB value. In other words, the saturation component image 620 can be said to be an image in which the difference in the color intensity of the part stained by the staining solution is emphasized (that is, absence of cracks is emphasized).

The two-dimensional image generation unit 450 assigns each pixel value (any value of 0 to 255) of the foreground region in the generated saturation component image 620 to any color in the range of blue, green, yellow, orange, and red, thereby generating a two-dimensional image 621. The example of FIG. 6B illustrates that blue is assigned to the pixel having the smallest pixel value in the foreground region of the saturation component image 620, and red is assigned to the pixel having the largest pixel value in the foreground region of the saturation component image 620.

The three-dimensional image generation unit 460 assigns each pixel value (any value of 0 to 255) of the foreground region in the generated saturation component image 620 to any color in the range of blue, green, yellow, orange, and red. Further, the three-dimensional image generation unit 460 assigns each pixel value (any value of 0 to 255) of the foreground region in the generated saturation component image 620 to a z-value (any value of 0 to 255) in the three-dimensional space. Thus, the three-dimensional image generation unit 460 generates the three-dimensional image 622.

In the three-dimensional image 622, the x and y directions represent the position of each pixel of the saturation component image 620, and the z direction represents the pixel value of each pixel of the saturation component image 620.

By generating the two-dimensional image 621 and the three-dimensional image 622, the image (the saturation component image 620) in which no crack has occurred can be visualized more clearly.

Figure 7:
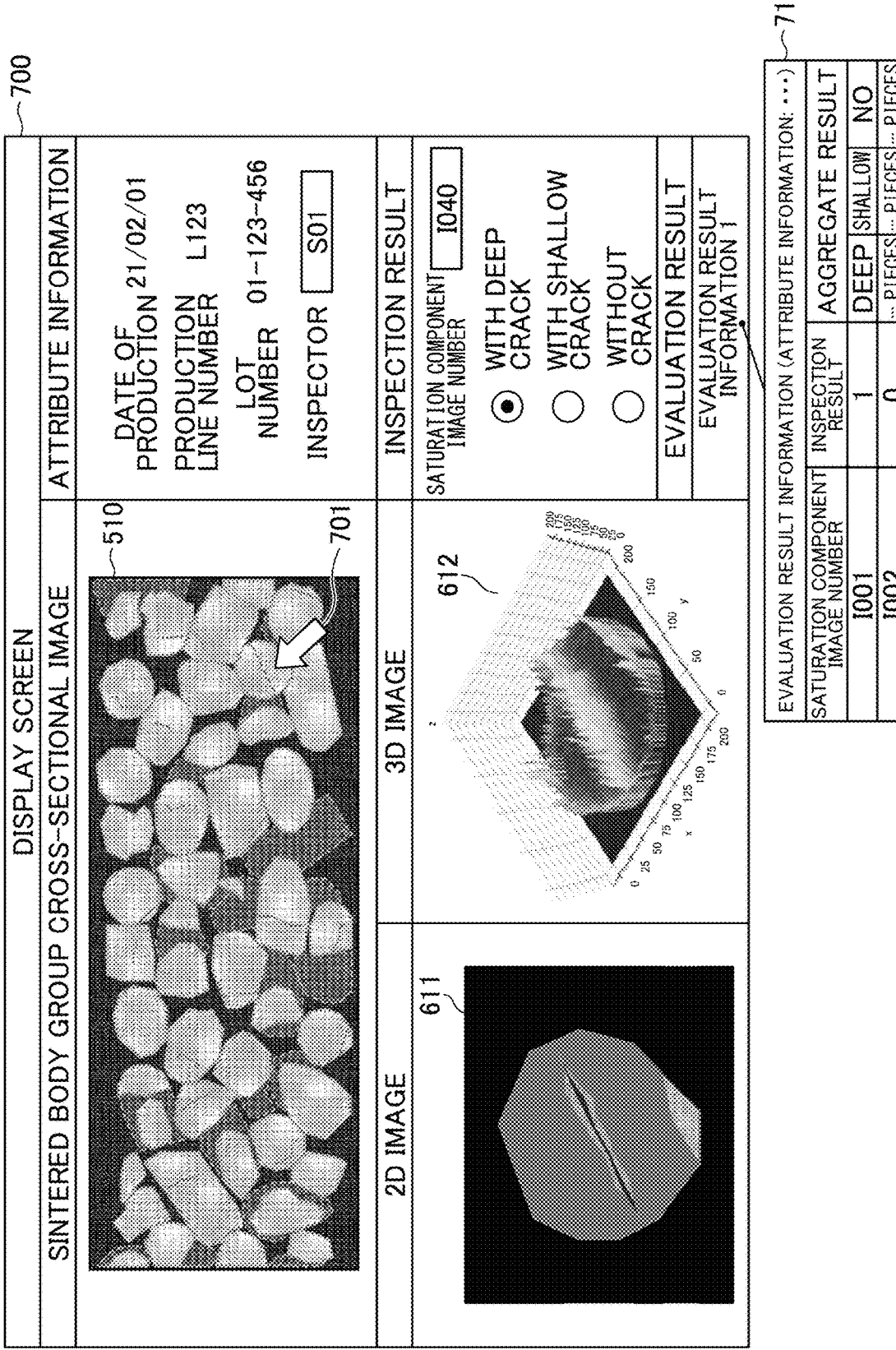
FIG. 7 is a diagram illustrating a specific example of processing performed by a display control unit and an operation reception unit.

(3) Specific Example of Processing by Display Control Unit and Operation Reception Unit Next, specific examples of processing performed by the display control unit 470 and the operation reception unit 480 of the evaluation apparatus 300 will be described. FIG. 7 is a diagram illustrating a specific example of processing performed by each unit of the display control unit and the operation reception unit. In FIG. 7, the display screen 700 is an example of a display screen generated by the display control unit 470. As illustrated in FIG. 7, the display screen 700 includes, as display items, "sintered body group cross-sectional image", "attribute information", "two-dimensional image", "three-dimensional image", "inspection result", and "evaluation result".

In the "sintered body group cross-sectional image", the sintered body group cross-sectional image 510 to be evaluated is displayed. In the "attribute information", the date of manufacture, the production line number, and the lot number of the sintered body are displayed as the attribute information added to the sintered body group cross-sectional image 510 to be evaluated. In addition, in the "attribute information", the identification number of the inspector who determines the presence or absence of cracks for each of sintered bodies included in the sintered body group cross-sectional image 510 to be evaluated, is displayed.

In the "two-dimensional image", the two-dimensional image 611 corresponding to the sintered body designated by the inspector (the sintered body designated by the arrow 701) on the sintered body group cross-sectional image 510 displayed in the "sintered body group cross-sectional image", is displayed.

In the "three-dimensional image", the three-dimensional image 612 corresponding to the sintered body designated by the inspector (the sintered body designated by the arrow 701) on the sintered body group cross-sectional image 510 displayed in the "sintered body group cross-sectional image", is displayed.

In the "inspection result", the inspection result is input by the inspector referring to the two-dimensional image 611 and the three-dimensional image 612, for the sintered body designated by the inspector (the sintered body designated by the arrow 701) on the sintered body group cross-sectional image 510 displayed in the "sintered body group cross-sectional image".

Specifically, in the "inspection result", the saturation component image number corresponding to the sintered body designated by the inspector (the sintered body designated by the arrow 701) on the sintered body group cross-sectional image 510 displayed in the "sintered body group cross-sectional image", is displayed. In the "inspection result", a selection field is displayed for the inspector to determine whether the sintered body is "with deep crack", "with shallow crack", or "without crack" and to select one of them. The inspector determines by referring to the two-dimensional image 611 and the three-dimensional image 612 and selects one of the items in the selection field to input the inspection result of each of sintered bodies.

In the "evaluation result", the evaluation result information 710 (file name="evaluation result information 1") obtained by aggregating the inspection result of each of sintered bodies by the inspector, is displayed.

The evaluation result information 710 includes the inspection result (2=with deep crack, 1=with shallow crack, 0=without crack) for each saturation component image (that is, for each of sintered bodies). The evaluation result information 710 includes the aggregate result (the number of sintered bodies determined to be with a deep crack, the number of sintered bodies determined to be with a shallow crack, and the number of sintered bodies determined to be without cracks). Further, the evaluation result information 710 includes the calculation result (percentage of the sintered bodies determined to be with a deep crack in the sintered body group).

<Flow of Evaluation Process>

Next, the overall flow of the evaluation process will be described. FIG. 8 is a first flowchart illustrating the flow of the evaluation process.

In step S801, the inspector collects a sintered body group manufactured on the same production line and under the same lot number.

In step S802, the inspector embeds the collected sintered body group in resin.

In step S803, the inspector cuts the sintered body group embedded in the resin so as to obtain a cross section of the sintered body group.

In step S804, the inspector stains the cross section of the sintered body group obtained by cutting using a staining solution.

In step S805, the inspector photographs the cross section of the sintered body group stained with the staining solution, thereby generating a sintered body group cross-sectional image and storing it in the sintered body group cross-sectional image storage unit 401.

In step S806, the evaluation apparatus 300 acquires the sintered body group cross-sectional image from the sintered body group cross-sectional image storage unit 401. The evaluation apparatus 300 extracts the foreground region from the sintered body group cross-sectional image and performs processing to make the background region black. Further, the evaluation apparatus 300 extracts the foreground region from the sintered body group cross-sectional image after processing, thereby extracting the separate image for each of sintered bodies.

In step S807, the evaluation apparatus 300 converts the pixel values of each pixel in the foreground region of the extracted separate image from the RGB color space to the HSV color space, and extracts the saturation component, thereby generating the saturation component image. The evaluation apparatus 300 stores the generated saturation component image in the evaluation result storage unit 402, and generates a two-dimensional image and a three-dimensional image based on the generated saturation component image.

In step S808, the evaluation apparatus 300 generates a display screen including the sintered body group cross-sectional image and the attribute information, the two-dimensional image, and the three-dimensional image, and displays them to the inspector.

In step S809, the inspector inputs an inspection result for each of sintered bodies while referring to the two-dimensional image and the three-dimensional image. The evaluation apparatus 300 receives the inspection result input by the inspector and generates evaluation result information.

In step S810, the evaluation apparatus 300 outputs the generated evaluation result information.

SUMMARY

As is clear from the above description, the evaluation apparatus 300 according to the first embodiment performs: acquiring a sintered body group cross-sectional image by photographing a cross section of the sintered body group stained with a staining solution; extracting a separate image for each of sintered bodies from the acquired sintered body group cross-sectional image, converting the separate image to the HSV color space, and extracting a saturation component to generate a saturation component image; and displaying a two-dimensional image and a three-dimensional image obtained by visualizing the saturation component image.

By generating the saturation component image representing the crack depth in the cross section of the sintered body and visualizing it as a two-dimensional image or a three-dimensional image, the inspector can determine the presence or absence of the deep crack with high accuracy.

That is, according to the first embodiment, it is possible to provide an evaluation apparatus, an evaluation method, and an evaluation program that can appropriately evaluate the quality of the sintered body group.

Second Embodiment

In the first embodiment described above, the saturation component image representing the crack depth in the cross section of the sintered body is visualized and provided to the inspector so that the inspector can evaluate the quality of the sintered body group.

In contrast, in the second embodiment, the saturation component image representing the crack depth in the cross section of the sintered body and the inspection result by the inspector are used as training data, and the inspection result is predicted from the saturation component image by performing a training process on the training model. In addition, the quality evaluation of the sintered body group is automatically performed based on the predicted inspection result. Hereinafter, the second embodiment will be described focusing on the difference from the first embodiment.

<Functional Configuration of Evaluation Apparatus (Training Phase)>

Figure 9:
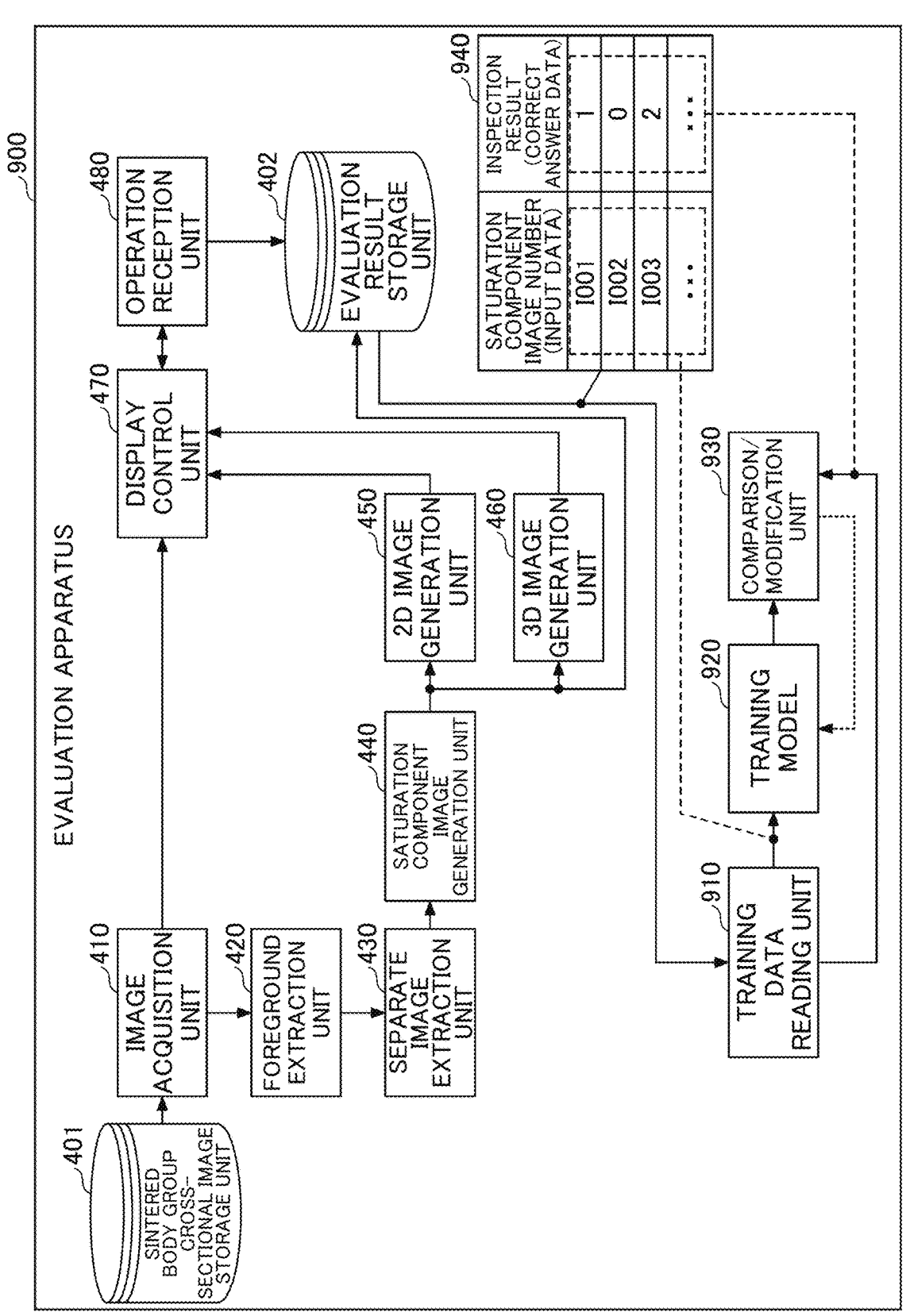
FIG. 9 is a diagram illustrating an example of a functional configuration of the evaluation apparatus in a training phase.

First, the functional configuration of the evaluation apparatus according to the second embodiment in the training phase will be described. FIG. 9 is a diagram illustrating an example of the functional configuration of the evaluation apparatus in the training phase. The difference from the functional configuration of the evaluation apparatus 300 described with reference to FIG. 4 in the first embodiment is that the evaluation apparatus 900 illustrated in FIG. 9 includes a training data reading unit 910, a training model 920, and a comparison/modification unit 930, in addition to the functional configuration of the evaluation apparatus 300.

The training data reading unit 910 reads training data 940 to be used as input data that is the saturation component image specified by the saturation component image number and as ground-truth data that is the inspection result, from the evaluation result information (for example, the evaluation result information 710) stored in the evaluation result storage unit 402.

The training data reading unit 910 inputs the saturation component image as the input data from the read training data 940 to the training model 920. Further, the training data reading unit 910 inputs the inspection result as the ground-truth data from the read training data 940 to the comparison/modification unit 930.

Specifically, the training data reading unit 910 inputs, when the inspection result is "(2) with deep crack", (probability of "with deep crack", probability of "with shallow crack", probability of "without crack")=(1, 0, 0) to the comparison/modification unit 930. The training data reading unit 910 inputs, when the inspection result is "(1) with shallow crack", (probability of "with deep crack", probability of "with shallow crack", probability of "without crack")= (0, 1, 0) to the comparison/modification unit 930. The training data reading unit 910 inputs, when the inspection result is "(0) without crack", (probability of "with deep crack", probability of "with shallow crack", probability of "without crack")=(0, 0, 1) to the comparison/modification unit 930.

The training model 920 outputs output data (probability of "with deep crack", probability of "with shallow crack", probability of "without crack") according to the input of the saturation component image. In response to the output of the output data by the training model 920, the comparison/modification unit 930 updates the model parameters of the training model 920. Examples of the training model 920 include AlexNet, VGG16, ResNet, or the like.

The comparison/modification unit 930 calculates an error between the output data output from the training model 920 and the inspection result which is the ground-truth data input by the training data reading unit 910, and updates the model parameters of the training model 920 according to the calculated error.

Thus, according to the evaluation apparatus 900, the trained model for predicting the inspection result from the saturation component image can be generated.
<Flow of Training Process>

Figure 10:
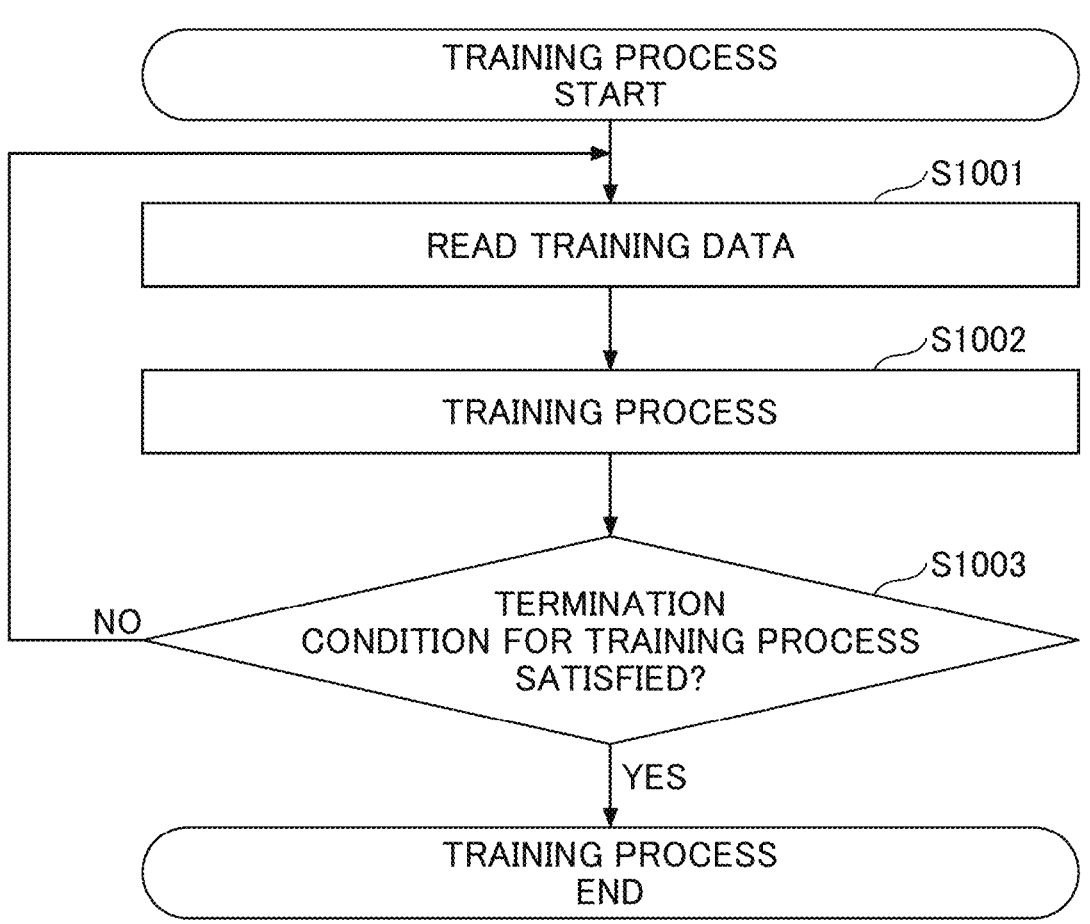
FIG. 10 is a flowchart illustrating a flow of a training process.

Next, the flow of the training process by the evaluation apparatus 900 will be described. FIG. 10 is a flowchart illustrating the flow of the training process. When starting the training process illustrated in FIG. 10, it is assumed that the evaluation process illustrated in FIG. 8 is executed in advance, and a predetermined amount of training data 940 is readably stored in the evaluation result storage unit 402.

In step S1001, the evaluation apparatus 900 reads the training data from the evaluation result storage unit 402.

In step S1002, the evaluation apparatus 900 performs the training process on the training model using the read training data.

In step S1003, the evaluation apparatus 900 determines whether the end condition of the training process is satisfied. When it is determined in step S1003 that the end condition of the training process is not satisfied (in the case of NO in step S1003), the process returns to step S1001.

In contrast, when it is determined in step S1003 that the end condition of the training process is satisfied (in the case of YES in step S1003), the process ends.
<Functional Configuration of Evaluation Apparatus (Evaluation Phase)>

Figure 11:
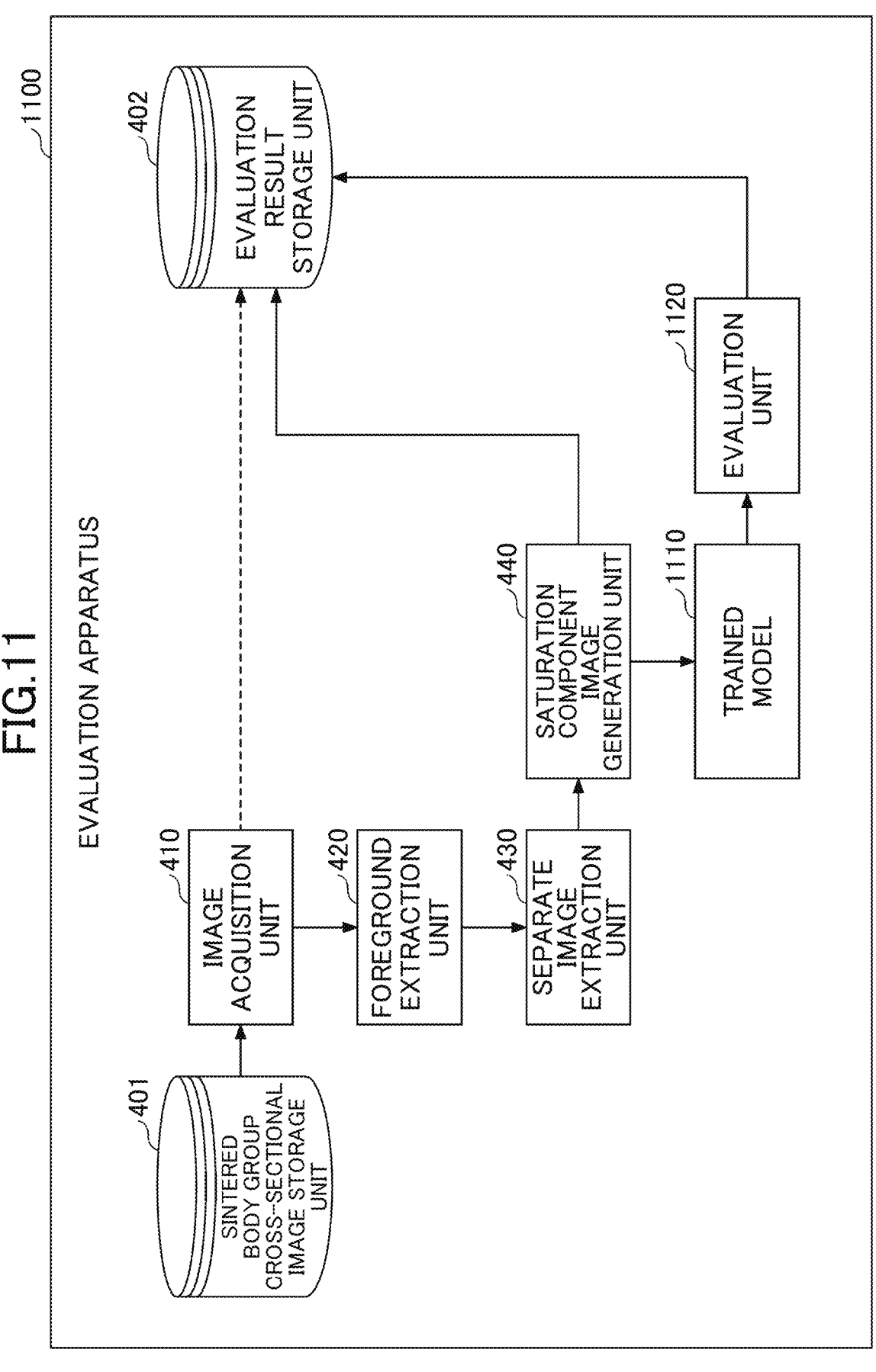
FIG. 11 is a diagram illustrating an example of a functional configuration of the evaluation apparatus in an evaluation phase.

Next, the functional configuration of the evaluation apparatus according to the second embodiment in the evaluation phase will be described. FIG. 11 is a diagram illustrating an example of the functional configuration of the evaluation apparatus in the evaluation phase. The difference from the functional configuration of the evaluation apparatus 300 described with reference to FIG. 4 in the first embodiment is that the evaluation apparatus 1100 in FIG. 11 does not include: the two-dimensional image generation unit 450; the three-dimensional image generation unit 460; the display control unit 470; and the operation reception unit 480, and includes: a trained model 1110; and an evaluation unit 1120, in addition to the functional configuration of the evaluation apparatus 300.

The trained model 1110 is a trained model generated by performing the training process using the training data 940 in the training phase. The trained model 1110 predicts the inspection result by the saturation component image generated by the saturation component image generation unit 440 being input. The trained model 1110 notifies the predicted inspection result to the evaluation unit 1120 in association with the saturation component image.

The evaluation unit 1120 stores the inspection result for each saturation component image notified by the trained model 1110 in the evaluation result storage unit 402 in association with the attribute information notified by the image acquisition unit 410. The evaluation unit 1120 aggregates the inspection result and stores the aggregate result (the number of sintered bodies determined to be with a deep crack, the number of sintered bodies determined to be with a shallow crack, and the number of sintered bodies determined to be without cracks, in the sintered body group) in the evaluation result storage unit 402. Further, the evaluation unit 1120 calculates the percentage of sintered bodies determined to be with a deep crack in the sintered body group and stores the calculation result in the evaluation result storage unit 402.
<Flow of Evaluation Process>

Figure 12:
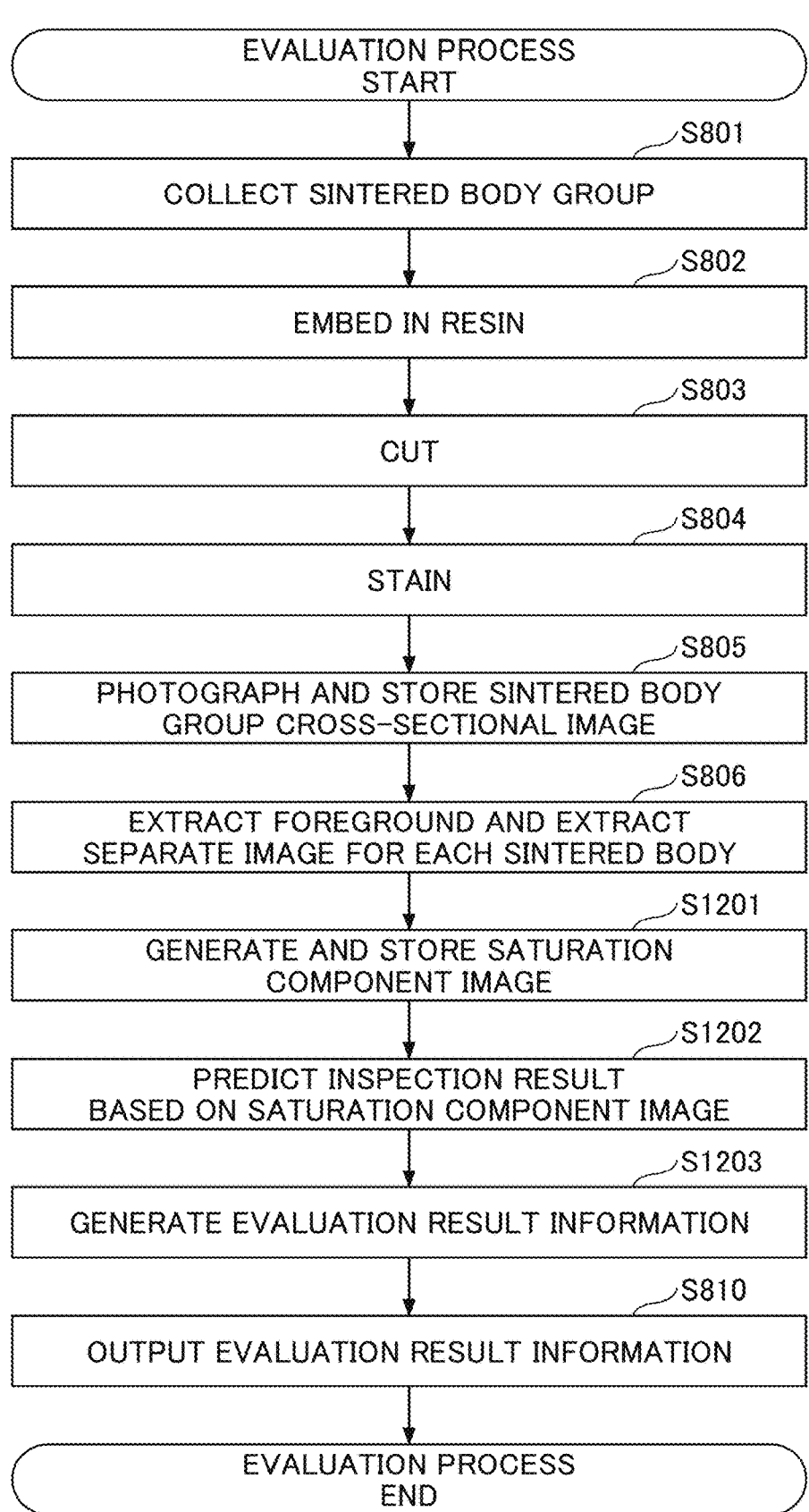
FIG. 12 is a second flowchart illustrating a flow of the evaluation process.

Next, the overall flow of the evaluation process will be described. FIG. 12 is a second flowchart illustrating the flow of the evaluation process. The difference from the first flowchart described with reference to FIG. 8 is steps S1201 to S1203.

In step S1201, the evaluation apparatus 300 converts each pixel value of the foreground region in the extracted separate image from the RGB color space to the HSV color space, and extracts the saturation component, and thereby generates the saturation component image. The evaluation apparatus 300 stores the generated saturation component image in the evaluation result storage unit 402.

In step S1202, the evaluation apparatus 300 predicts the inspection result based on the generated saturation component image.

In step S1203, the evaluation apparatus 300 generates the evaluation result information including the predicted inspection result and the like.

SUMMARY

As is clear from the above description, the evaluation apparatus 900 according to the second embodiment performs, in the training phase: reading the training data having the saturation component image as the input data and the inspection result as the ground-truth data from the evaluation result storage unit, and performing the training process on the training model.

The evaluation apparatus 1100 according to the second embodiment performs, in the evaluation phase: predicting the inspection result of each of sintered bodies based on the saturation component image generated by the saturation component image generation unit; and generating and outputting the evaluation result information of the entire sintered body group including the inspection result of each predicted sintered body.

Thus, according to the second embodiment, by performing the training process on the training model using the inspection result input by the inspector, it is possible to predict the inspection result from the saturation component image, and automatically perform the quality evaluation of the sintered body group.

That is, according to the second embodiment, it is possible to provide an evaluation apparatus, an evaluation method, and an evaluation program capable of automatically evaluating the quality of a sintered body group.

Third Embodiment

In the first embodiment, the two-dimensional image or the three-dimensional image is generated based on the saturation component image and displayed on the display screen. However, the image displayed on the display screen is not limited thereto. For example, the saturation component image (the saturation component image 610 of FIG. 6A and the saturation component image 620 of FIG. 6B) may be displayed on the display screen.

In the first embodiment described above, when generating the two-dimensional image or the three-dimensional image, each pixel value (any value of 0 to 255) of the foreground region in the saturation component is assigned to any color in the range of blue, green, yellow, orange, and red. However, the specific color to which each pixel value (any value of 0 to 255) of the foreground region in the saturation component is assigned is not limited thereto. Any other color may be assigned as long as it is easily visible to the inspector.

In the first embodiment described above, both the two-dimensional image and the three-dimensional image are displayed on the display screen 700, but either the two-dimensional image or the three-dimensional image may be displayed on the display screen 700.

In the second embodiment described above, the trained model 1110 predicts the inspection result in place of the input of the inspection result by the inspector in the evaluation phase, and the evaluation unit 1120 automatically evaluates the quality of the sintered body group. However, the method of using the inspection result predicted by the trained model 1110 is not limited thereto. For example, when the inspector inputs the inspection result, the inspection result predicted by the trained model 1110 may be displayed on the display screen 700. That is, the predicted inspection result may be used to assist the inspector in determining the presence of deep cracks.

In the second embodiment described above, the evaluation apparatus 900 in the training phase and the evaluation apparatus 1100 in the evaluation phase are described as separate entities, but the evaluation apparatus 900 in the training phase and the evaluation apparatus 1100 in the evaluation phase may be configured as a single entity.

In the second embodiment described above, the configuration in which the inspection result is predicted using the trained model generated by the training process using the training data is described, but the cracks may be determined based on some rule. For example, in the case where the saturation component (S value) takes a value of 0 to 255, when the S value is 125 to 255, a deep crack may be determined, and when the S value is 30 to 124, a shallow crack may be determined. In addition, when the highest S value in all observed separate images is 100%, the crack composed of the S value of 60 to 100%, may be determined to be a deep crack, and the crack composed of the S value of 20% or more and less than 60% may be determined to be a shallow crack.

In each of the embodiments described above, the collected sintered body groups are embedded in the resin and then cut. However, when the particles of the sintered body are large, the sintered body may be cut without embedding in resin. In this case, the cross section of the sintered body obtained by cutting the sintered body is stained with a staining solution and photographed. (As a result, the separate image is obtained by extracting the foreground from the cross-sectional image of the single sintered body.) In this case, the inspector inputs the inspection result by referring to the two-dimensional image and the three-dimensional image displayed together with the cross-sectional image of the single sintered body displayed in place of the sintered body group cross-sectional image.

In each of the embodiments described above, the details of the sintered body are not mentioned, but the evaluation apparatus according to the above embodiments may be applied to any sintered body. As an example, the evaluation apparatus according to the above embodiments may be applied to various sintered bodies of silicon carbide, aluminum nitride, silicon nitride, boron nitride, alumina, mullite, silica, zirconia, and the like.

Figure 13:
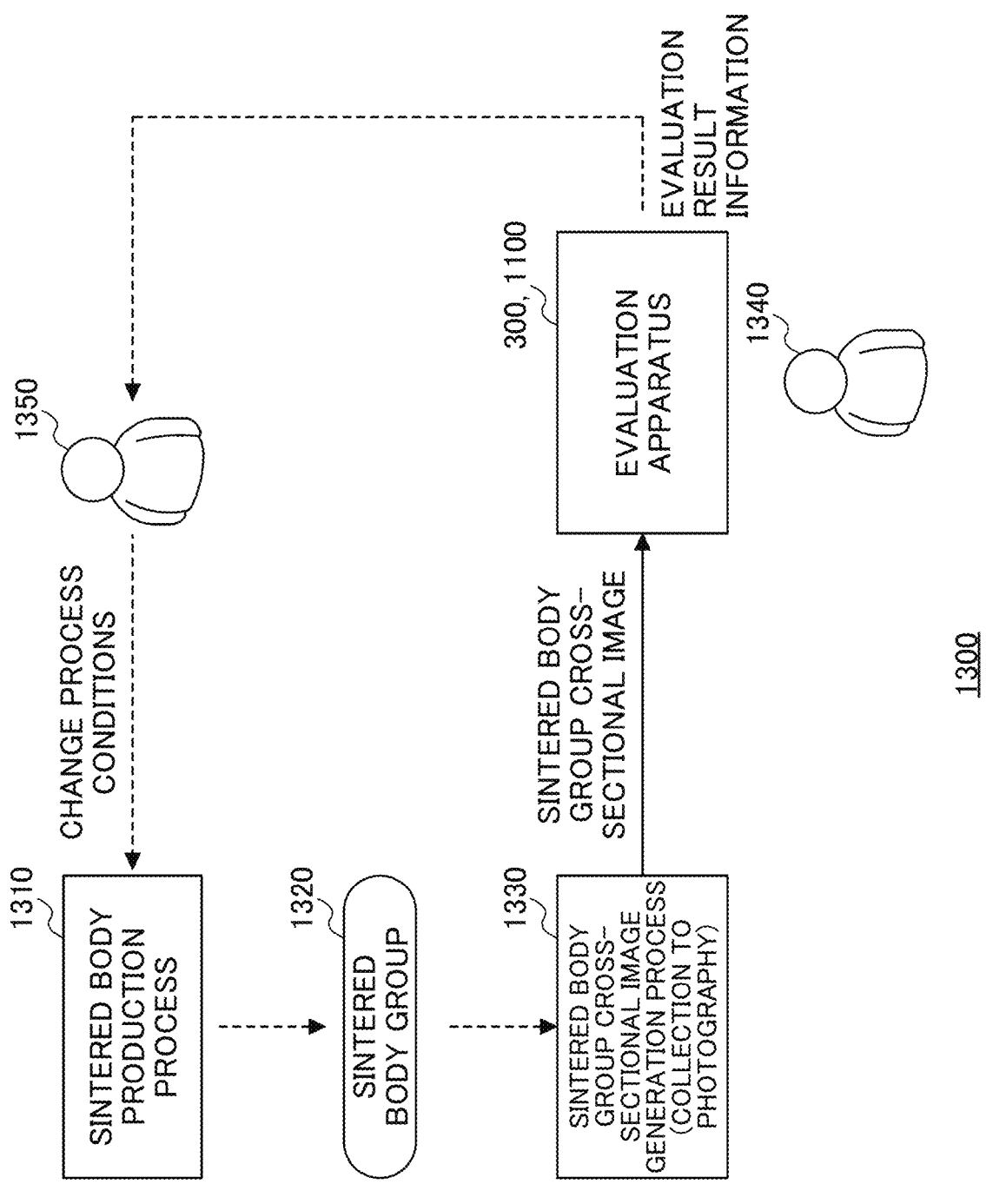
FIG. 13 is a diagram illustrating an application example of the evaluation apparatus.

In each of the embodiments described above, the method of using the evaluation result information is not mentioned, but the evaluation result information may be used, for example, for process control of a sintered body production process. FIG. 13 is a diagram illustrating an application example of the evaluation apparatus. As illustrated in FIG. 13, the evaluation apparatus 300 and 1100 may be applied, for example, to a process control system 1300.

The example of FIG. 13 illustrates a case where the process control system 1300 includes a sintered body production process 1310, a sintered body group cross-sectional image generation process 1330, and the evaluation apparatus 300 (or 1100).

According to the example of FIG. 13, a sintered body group 1320 produced in the sintered body production process 1310 undergoes the sintered body group cross-sectional image generation process 1330, and the sintered body group cross-sectional image is generated and input to the evaluation apparatus 300 (or 1100). The evaluation result information output from the evaluation apparatus 300 (or 1100) is notified to a worker 1350 by the inspector 1340, for example, and the worker 1350 sets the process conditions corresponding to the evaluation result information to the sintered body production process 1310.

Thus, in the sintered body production process 1310, the process control corresponding to the evaluation result information can be executed.

The present invention is not limited to the configurations described here, such as the configuration described in the above embodiment or the combination with other elements. These aspects can be changed without departing from the purpose of the invention, and can be determined appropriately according to the type of application.

The present application is based upon and claims priority to Japanese Patent Application No. 2021-113592, filed on Jul. 8, 2021, the entire contents of which are incorporated herein by reference.

DESCRIPTION OF REFERENCE NUMERALS

300 Evaluation apparatus
410 Image acquisition unit
420 Foreground extraction unit
430 Separate image extraction unit
440 Saturation component image generation unit

450 Two-dimensional image generation unit
460 Three-dimensional image generation unit
470 Display control unit
480 Operation reception unit
510 Sintered body group cross-sectional image
520 Sintered body group cross-sectional image
531, 532 Separate image
610, 620 Saturation component image
611, 621 Two-dimensional image
612, 622 Three-dimensional image
700 Display screen
710 Evaluation result information
910 Training data reading unit
920 Training model
930 Comparison/modification unit
940 Training data
1110 Trained model
1120 Evaluation unit
The invention claimed:

1. An evaluation apparatus comprising:
a memory; and
a processor coupled to the memory and configured to:
acquire a cross-sectional image obtained by photograph-
ing a cross-section of a sintered body group stained
with a staining solution;
extract a saturation component for each of sintered bodies
from the cross-sectional image, thereby to generate a
saturation component image; and
visualize the saturation component image.

2. The evaluation apparatus according to claim 1, wherein
the processor is configured to convert each pixel value of a
separate image that is extracted for each of the sintered
bodies from the cross-sectional image, from an (Red, Green,
Blue) (RGB) color space to an (Hue, Saturation, Value)
(HSV) color space, and to extract a saturation component
from the converted each pixel value, thereby to generate the
saturation component image.

3. The evaluation apparatus according to claim 2, wherein
the cross-sectional image is obtained by cutting a resin in
which the sintered body group is embedded, staining
the cross-section obtained by the cutting with the
staining solution, and photographing the cross-section,
and
the processor is configured to extract a region of the
sintered bodies exposed in the cross-section as a fore-
ground region from the cross-sectional image, thereby
to extract the separate image for each of the sintered
bodies from the cross-sectional image.

4. The evaluation apparatus according to claim 3, wherein
the processor is configured to process a background region
other than the foreground region in the cross-sectional
image, and to extract the foreground region from the pro-
cessed cross-sectional image.

5. The evaluation apparatus according to claim 1, wherein
the processor is configured to generate a two-dimensional
image in which a value of a saturation component of each of
pixels of the saturation component image is assigned to a
specific color, thereby to visualize the saturation component
image.

6. The evaluation apparatus according to claim 5, wherein
the processor is configured to generate a three-dimensional
image in which the value of the saturation component of
each of the pixels of the saturation component image is
assigned to the specific color and also assigned to a coor-
dinate in a height direction in a three-dimensional space,
thereby to visualize the saturation component image.

7. The evaluation apparatus according to claim 6, further
comprising a storage in which an inspection result for each
of the sintered bodies, which is input in response to display-
ing a display screen including one or both of the two-
dimensional image and the three-dimensional image, is
stored in association with the saturation component image.

8. The evaluation apparatus according to claim 7, wherein
the inspection result is any one of: a crack of a first depth
level is included in a sintered body; a crack of a second depth
level shallower than the first depth level is included in the
sintered body; or no cracks are included in the sintered body.

9. The evaluation apparatus according to claim 8, wherein
evaluation result information including an aggregate result
and a calculation result is output, in which the aggregate
result is obtained by aggregating, for the sintered body
group, the inspection result for each of the sintered bodies,
and in which the calculation result is obtained by calculating
a percentage of sintered bodies that include the crack of the
first depth level.

10. The evaluation apparatus according to claim 8,
wherein a training process is performed on a training model
using training data read from the storage with the saturation
component image as input data and the inspection result in
association with the saturation component image as ground-
truth data.

11. The evaluation apparatus according to claim 8,
wherein a trained model, which has been trained by a
training process using training data read from the storage
with the saturation component image as the input data and
the inspection result in association with the saturation com-
ponent image as the ground-truth data, receives as input a
saturation component image generated from a newly pho-
tographed cross-sectional image, to predict an inspection
result.

12. The evaluation apparatus according to claim 11,
wherein evaluation result information including an aggre-
gate result and a calculation result is output, in which the
aggregate result is obtained by aggregating, for the sintered
body group, the inspection result predicted for each of the
sintered bodies, and in which the calculation result is
obtained by calculating a percentage of sintered bodies that
include the crack of the first depth level.

13. An evaluation method comprising:
acquiring a cross-sectional image obtained by photo-
graphing a cross-section of a sintered body group
stained with a staining solution;
extracting a saturation component for each of sintered
bodies from the cross-sectional image, thereby gener-
ating a saturation component image; and
visualizing the saturation component image.

14. A non-transitory computer-readable recording
medium storing a program for causing a computer to
execute:
acquiring a cross-sectional image obtained by photo-
graphing a cross-section of a sintered body group
stained with a staining solution;
extracting a saturation component for each of sintered
bodies from the cross-sectional image, thereby gener-
ating a saturation component image; and
visualizing the saturation component image.

* * * * *